United States Patent
Takeda et al.

(10) Patent No.: US 11,496,966 B2
(45) Date of Patent: Nov. 8, 2022

(54) POWER CONTROL FOR SHARED FEEDBACK

(71) Applicant: QUALCOMM incorporated, San Diego, CA (US)

(72) Inventors: Kazuki Takeda, Tokyo (JP); Le Liu, Fremont, CA (US); Peter Gaal, San Diego, CA (US); Ayan Sengupta, San Diego, CA (US); Alberto Rico Alvarino, San Diego, CA (US); Xiaoxia Zhang, San Diego, CA (US); Tao Luo, San Diego, CA (US); Wanshi Chen, San Diego, CA (US); Prasad Reddy Kadiri, San Diego, CA (US); Mostafa Khoshnevisan, San Diego, CA (US); Umesh Phuyal, San Diego, CA (US); Xipeng Zhu, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 0 days.

(21) Appl. No.: 17/171,696

(22) Filed: Feb. 9, 2021

(65) Prior Publication Data
US 2021/0250872 A1   Aug. 12, 2021

Related U.S. Application Data

(60) Provisional application No. 62/972,820, filed on Feb. 11, 2020.

(51) Int. Cl.
*H04W 52/14* (2009.01)
*H04W 4/06* (2009.01)
(Continued)

(52) U.S. Cl.
CPC .......... *H04W 52/146* (2013.01); *H04W 4/06* (2013.01); *H04W 52/241* (2013.01);
(Continued)

(58) Field of Classification Search
CPC ... H04L 12/1868; H04L 12/18; H04L 12/189; H04W 4/06; H04W 52/10; H04W 52/146;
(Continued)

(56) References Cited

U.S. PATENT DOCUMENTS

2020/0029297 A1* 1/2020 Baek .................. H04W 76/11
2020/0092685 A1* 3/2020 Fehrenbach ........... H04W 4/46
(Continued)

*Primary Examiner* — John J Lee
(74) *Attorney, Agent, or Firm* — Holland & Hart LLP

(57) ABSTRACT

Methods, systems, and devices for wireless communications are described. A base station may communicate with a user equipment (UE) or multiple UEs using multicast transmissions, and each of the multiple UEs may use shared resources to transmit feedback. A UE may receive a power control configuration associated with multicast communications and indicating one or more control parameters or weighting factors for uplink feedback. The UE may monitor a set of downlink resources for the multicast message from the base station, and may determine a decoding failure for the multicast message. The UE may determine whether to transmit uplink feedback to the base station based on the received power control parameters, such as adjusting UE transmit power using a weighting factor or other power control parameters. The UE may determine whether to transmit the uplink feedback message indicating the decoding failure based on the power control configuration.

29 Claims, 21 Drawing Sheets

(51) Int. Cl.
*H04W 72/00* (2009.01)
*H04W 52/24* (2009.01)
*H04W 72/04* (2009.01)
*H04L 12/18* (2006.01)

(52) U.S. Cl.
CPC ....... *H04W 52/245* (2013.01); *H04W 72/005* (2013.01); *H04W 72/0413* (2013.01); *H04L 12/189* (2013.01)

(58) Field of Classification Search
CPC ............. H04W 52/241; H04W 52/245; H04W 72/005; H04W 72/0413
USPC .......... 455/522, 69, 452.1, 452.2, 509, 67.11
See application file for complete search history.

(56) References Cited

U.S. PATENT DOCUMENTS

2021/0051594 A1\* 2/2021 Chae ..................... H04L 1/0026
2021/0127351 A1\* 4/2021 Stojanovski .......... H04W 48/16

\* cited by examiner

POWER CONTROL FOR SHARED FEEDBACK

CROSS REFERENCE

The present application for patent claims the benefit of U.S. Provisional Patent Application No. 62/972,820 by TAKEDA et al., entitled "POWER CONTROL FOR SHARED FEEDBACK," filed Feb. 11, 2020, assigned to the assignee hereof, and expressly incorporated by reference herein.

TECHNICAL FIELD

The following relates generally to wireless communications and more specifically to power control for shared feedback.

DESCRIPTION OF THE RELATED TECHNOLOGY

Wireless communications systems are widely deployed to provide various types of communication content such as voice, video, packet data, messaging, broadcast, and so on. These systems may be capable of supporting communication with multiple users by sharing the available system resources (for example, time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may be configured to support feedback messaging for data transmissions in the network. Resources for transmitting feedback may be allocated to UEs individually, or the resources may be shared resources configured for use by multiple UEs. In some cases, however, the network may be unable to distinguish how many UEs send feedback using the shared resources or distinguish the specific UE(s) that send feedback. Additionally, feedback signals from multiple UEs may interfere or collide with each other using the shared resources, which may negatively impact the strength or the quality of the received signal at a receiving device, such as a base station, and may reduce the likelihood that a feedback transmission is accurately received.

SUMMARY

The described techniques relate to improved methods, systems, devices, and apparatuses that support power control for shared feedback for multicast communications. In some wireless systems, a base station may communicate with multiple user equipment (UEs) by transmitting a multicast message to the UEs. To reduce signaling overhead, a UE in such wireless systems may use shared resources, which may be shared among the multiple UEs, to transmit a feedback message associated with the multicast message to the base station. In some examples, the UE may receive a power control configuration from the base station. The power control configuration may be associated with the multicast message and may indicate power control parameters that may affect the transmit power with which the UE transmits the feedback message to the base station. Such power control parameters may include, but are not limited to, a power control weighting factor, a channel quality threshold, a transmit power threshold, a probability factor, a probability threshold, or any combination thereof. For example, if a decoding failure of the multicast message at the UE occurs, the UE may determine, based on the power control parameters, to transmit the feedback message to the base station if a channel quality is above a channel quality threshold or the UE may determine to refrain from transmitting the feedback message if the channel quality is below the channel quality threshold. In some aspects, the UE may determine to transmit the feedback message if a number of decoding failures at the UE exceeds a probability threshold, or the UE may determine to refrain from transmitting the feedback message if the number of decoding failures at the UE is below the probability threshold. If the UE determines to transmit the feedback message, the UE may adjust a transmit power for the feedback message based on the weighting factors indicated by the power control configuration.

One innovative aspect of the subject matter described in this disclosure can be implemented in a method for wireless communication. The method includes receiving, from a base station, a power control configuration indicating one or more power control parameters for an uplink feedback message associated with a multicast message, monitoring a set of downlink resources for a multicast message from the base station, determining a decoding failure for the multicast message based on the monitoring, determining, based on the one or more power control parameters, whether to transmit the uplink feedback message indicating the decoding failure via a set of uplink resources allocated to a group of UEs including the UE, and communicating with the base station based on determining whether to transmit the uplink feedback message indicating the decoding failure.

Another innovative aspect of the subject matter described in this disclosure can be implemented in an apparatus for wireless communications. The apparatus includes a processor, memory coupled with the processor, and instructions stored in the memory. The instructions may be executable by the processor to cause the apparatus to receive, from a base station, a power control configuration indicating one or more power control parameters for an uplink feedback message associated with a multicast message, monitor a set of downlink resources for the multicast message from the base station, determine a decoding failure for the multicast message based on the monitoring, determine, based on the one or more power control parameters, whether to transmit the uplink feedback message indicating the decoding failure via a set of uplink resources allocated to a group of UEs including the UE, and communicate with the base station based on determining whether to transmit the uplink feedback message indicating the decoding failure.

Another innovative aspect of the subject matter described in this disclosure can be implemented in an apparatus for wireless communications. The apparatus includes means for receiving, from a base station, a power control configuration indicating one or more power control parameters for an uplink feedback message associated with a multicast message, monitoring a set of downlink resources for the multicast message from the base station, determining a decoding failure for the multicast message based on the monitoring, determining, based on the one or more power control parameters, whether to transmit the uplink feedback message indicating the decoding failure via a set of uplink resources allocated to a group of UEs including the UE, and communicating with the base station based on determining whether to transmit the uplink feedback message indicating the decoding failure.

Another innovative aspect of the subject matter described in this disclosure can be implemented in a non-transitory computer-readable medium storing code for wireless communications. The code includes instructions executable by a processor to receive, from a base station, a power control configuration indicating one or more power control parameters for an uplink feedback message associated with a multicast message, monitor a set of downlink resources for the multicast message from the base station, determine a decoding failure for the multicast message based on the monitoring, determine, based on the one or more power control parameters, whether to transmit the uplink feedback message indicating the decoding failure via a set of uplink resources allocated to a group of UEs including the UE, and communicate with the base station based on determining whether to transmit the uplink feedback message indicating the decoding failure.

Some examples of the method, apparatuses, and non-transitory computer-readable medium described herein may further include operations, features, means, or instructions for determining a weighting factor of the one or more power control parameters for an uplink control channel based on the power control configuration, and determining a transmit power for the uplink feedback message based on the weighting factor, in which communicating with the base station includes transmitting the uplink feedback message in the uplink control channel via the set of uplink resources based on the transmit power.

Some examples of the method, apparatuses, and non-transitory computer-readable medium described herein may further include operations, features, means, or instructions for determining the weighting factor of the one or more power control parameters based on a channel quality parameter associated with the UE, in which the channel quality parameter includes one or more of a pathloss, a signal to interference plus noise ratio, a signal to noise ratio, a reference signal received power, a reference signal received quality, or a channel quality indicator.

Some examples of the method, apparatuses, and non-transitory computer-readable medium described herein may further include operations, features, means, or instructions for receiving an indication of the weighting factor of the one or more power control parameters from the base station.

One innovative aspect of the subject matter described in this disclosure can be implemented in a method for wireless communication. The method includes transmitting an indication of a power control configuration indicating one or more power control parameters for an uplink feedback message associated with a multicast message for a group of UEs, transmitting the multicast message to the group of UEs, and monitoring a set of uplink resources allocated to one or more of the group of UEs for the uplink feedback message from a UE of the group of UEs.

Another innovative aspect of the subject matter described in this disclosure can be implemented in an apparatus for wireless communications. The apparatus includes a processor, memory coupled with the processor, and instructions stored in the memory. The instructions may be executable by the processor to cause the apparatus to transmit an indication of a power control configuration indicating one or more power control parameters for an uplink feedback message associated with a multicast message for a group of UEs, transmit the multicast message to the group of UEs, and monitor a set of uplink resources allocated to one or more of the group of UEs for the uplink feedback message from a UE of the group of UEs.

Another innovative aspect of the subject matter described in this disclosure can be implemented in an apparatus for wireless communications. The apparatus includes means for transmitting an indication of a power control configuration indicating one or more power control parameters for an uplink feedback message associated with a multicast message for a group of UEs, transmitting the multicast message to the group of UEs, and monitoring a set of uplink resources allocated to one or more of the group of UEs for the uplink feedback message from a UE of the group of UEs.

Another innovative aspect of the subject matter described in this disclosure can be implemented in a non-transitory computer-readable medium storing code for wireless communications. The code includes instructions executable by a processor to transmit an indication of a power control configuration indicating one or more power control parameters for an uplink feedback message associated with a multicast message for a group of UEs, transmit the multicast message to the group of UEs, and monitor a set of uplink resources allocated to one or more of the group of UEs for the uplink feedback message from a UE of the group of UEs.

In some examples of the method, apparatuses, and non-transitory computer-readable medium described herein, transmitting the indication of the power control configuration may include operations, features, means, or instructions for transmitting the indication of the power control configuration via radio resource control (RRC) signaling, a medium access control (MAC) control element (MAC-CE), or downlink control information (DCI).

In some examples of the method, apparatuses, and non-transitory computer-readable medium described herein, the power control configuration includes a weighting factor or the one or more power control parameters for a transmit power, further comprising operations, features, means, or instructions for transmitting an indication of the weighting factor of the one or more power control parameters for the transmit power.

Some examples of the method, apparatuses, and non-transitory computer-readable medium described herein may further include operations, features, means, or instructions for receiving, from at least one UE of the group of UEs, a report including a channel quality indication for the at least one UE, and determining the weighting factor for the transmit power for the at least one UE based on the channel quality indication.

Some examples of the method, apparatuses, and non-transitory computer-readable medium described herein may further include operations, features, means, or instructions for determining a transmit power threshold of the one or more power control parameters associated with activation of uplink power control, in which transmitting the indication of the power control configuration includes transmitting an indication of the transmit power threshold of the one or more power control parameters.

DETAILED DESCRIPTION

Figure 1:
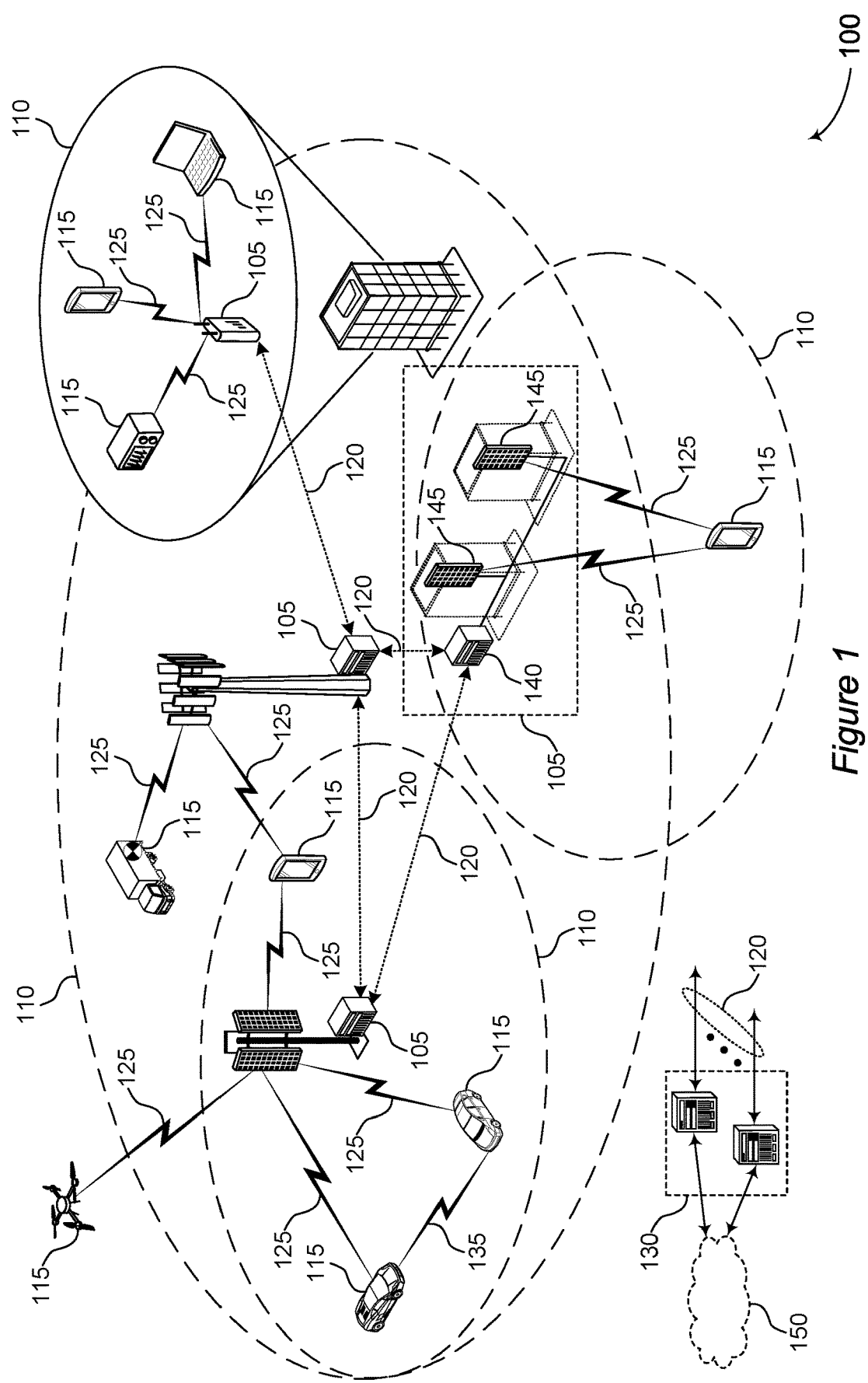
FIG. 1 illustrates an example of a wireless communications system that supports power control for shared feedback in accordance with aspects of the present disclosure.

In some wireless communications systems, a device such as a user equipment (UE) or base station may support feedback, such as hybrid automatic repeat request (HARQ) feedback, for multicast communications. In some cases, a base station may send a multicast message to a UE, and the UE may attempt to decode the multicast message sent from the base station. Based on the success or failure of the decoding of the multicast message, the UE may send a feedback message (such as an acknowledgement (ACK) or negative ACK (NACK) feedback message) for the multicast message using configured network resources, which may be referred to as shared resources, that are shared by multiple UEs. The shared resources may be uplink control resources (for example, shared physical uplink control channel (PUCCH) resources) that are available for use by the multiple UEs for transmitting respective feedback messages for the multicast message.

If multiple UEs fail to decode the multicast message from the base station and send respective feedback messages for the multicast message (for example, respective NACK feedback messages) to the base station using the shared resources, the base station may be unable to determine the number of UEs or which of the multiple UEs transmitted the feedback messages and as such, may not know which of the multiple UEs failed to decode the multicast message. Further, some of the multiple UEs may send respective feedback messages over the shared resources using the same or similar transmit power, as the multiple UEs may determine respective transmit powers based on respective power control parameters, which may be the same for some of the multiple UEs, and respective pathloss factors, which may be similar for some of the multiple UEs. For example, power control parameters may include various open loop power control parameters such as a power control weighting factor, a channel quality threshold, a transmit power threshold, a probability factor, a probability threshold, or any combination thereof. In some examples, the feedback messages from the multiple UEs may non-coherently combine over the air such that the base station observes a low received power or an imbalance in received power. The low received power or imbalance in received power may be due to channel conditions at each of the multiple UEs or the number of UEs transmitting feedback messages. For example, the base station may receive feedback messages having different power levels over the shared resources for different groups of UEs as different groups of UEs may be subject to different channel conditions or may be located at different distances away from the base station.

Various aspects generally relate to feedback in multicast communications systems, and more specifically, to transmission determination and power control techniques at a UE for a feedback message based on a multicast message from a base station. A wireless communications system may support transmission determination for enabling the UE to determine whether to transmit a feedback message in response to a multicast message from the base station. The transmission determination may be based on a channel condition at the UE or a power control parameter such as a probability factor of the UE such that the UE determines to transmit the feedback message if the channel condition is above a channel quality threshold or if the probability factor is above a probability threshold. For example, the UE may determine to transmit the feedback message if a channel quality parameter (for example, pathloss, signal to noise ratio (SNR), or both) at the UE is above the channel quality threshold or the UE may determine to refrain from transmitting the feedback message if the channel quality parameter is below the channel quality threshold. In some aspects, the UE may receive, from the base station, an indication of a probability factor for the UE and the UE may determine a probability threshold for the UE based on the probability factor. The UE may determine to transmit the feedback message if a number of decoding failures of the multicast message at the UE is above the probability threshold or the UE may determine to refrain from transmitting the feedback message if the number of decoding failures of the multicast message at the UE is below the probability threshold.

Additionally, or alternatively, the wireless communications system may support power control techniques for transmission of a feedback message, such as a NACK feedback message, over shared resources that are available for use by multiple UEs to transmit a feedback message in response to a multicast message from the base station. Such power control techniques may involve using a power control parameter such as a weighting factor, (for example, a parameter "α,") for use by a UE to determine a transmit power for the feedback message, or may involve using shared uplink control resources, such as a shared PUCCH, for transmission of the feedback message by the UE. In some aspects, the UE may multiply the weighting factor α by a pathloss factor to determine the transmit power for the feedback message, and the weighting factor α may be an integer value, a fractional value, or a value greater than 1. For some values of a, the transmit power may depend on pathloss such that a cell edge UE (or a UE that otherwise experiences high pathloss) may have increased transmit power as pathloss at the UE increases. The power control techniques herein may enable adjustment of a power control parameter such as an open loop power control parameter (for example, turning it on or off, among other adjustments) at a UE. For example, a base station may determine to turn on or activate an open loop power control parameter for a UE based on a channel quality parameter at the UE satisfying a threshold, and the UE may use the activated open loop power control parameter to determine a transmit power for the feedback message (for example, from a set of possible transmit powers). In other examples, the base station may determine to turn off or deactivate the open loop power control parameter for the UE based on a channel quality parameter at the UE failing to satisfy the threshold, and the UE may refrain from using the open loop power control parameter or may use a different open loop power control parameter to determine the transmit power for the feedback message. Additionally or alternatively, the UE may determine the transmit power for the feedback message by measuring pathloss at the UE and dynamically turning on or off different sets of open loop power control parameters based on whether the pathloss satisfies a threshold.

In some examples, the shared resources may be based on a group associated with the UE or a location of the UE relative to a zone of the wireless communications system. For example, a given zone may be associated with transmission parameters that a base station uses for transmitting multicast messages to UEs located in the given zone as well as a given set of shared resources, such as shared PUCCH resources, available for use by the UEs located in the given zone. If the base station receives one or more feedback messages over the given set of shared resources, the base station may adjust the transmission parameters and retransmit the multicast message to UEs located in the given zone using the adjusted transmission parameters.

Particular aspects of the subject matter described in this disclosure may be implemented to realize one or more of the following potential advantages. The techniques employed by the described communication devices may provide benefits and enhancements to the operation of the communication devices, including increased reliability for feedback messages from UEs in response to a multicast message from a base station. For example, operations performed by the described communication devices may provide improvements to reception of feedback messages at a base station by reducing or eliminating interference between multiple UEs sharing resources for transmission of feedback messages. In some implementations, the operations performed by the described communication devices to reduce or eliminate the interference include reducing the number of feedback messages transmitted by UEs in response to a multicast message based on channel conditions or probability factors associated with the UEs thereby limiting the number of UEs that transmit feedback messages and reducing network congestion or interference. In some implementations, the operations performed by the described communication devices to increase reliability for feedback messages may include adjusting transmit power used by UEs that transmit feedback messages thereby enabling a UE experiencing relatively high pathloss compared to other UEs in the wireless communications system to use an increased transmit power for a feedback message, which may lead to an increased likelihood of successful reception of the feedback message at the base station. In some other implementations, operations performed by the described communication devices may also support improvements to power consumption and resource usage, among other benefits.

Aspects of the disclosure are initially described in the context of wireless communications systems. Aspects are also described with respect to graphs and a process flow. Aspects of the disclosure are further illustrated by and described with reference to apparatus diagrams, system diagrams, and flowcharts that relate to power control for shared feedback.

FIG. 1 illustrates an example of a wireless communications system 100 that supports power control for shared feedback in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (for example, mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (for example, core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (for example, via an S1, N2, N3, or other interface). The base stations 105 may communicate with one another over the backhaul links 120 (for example, via an X2, Xn, or other interface) either directly (for example, directly between base stations 105), or indirectly (for example, via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (for example, a bandwidth part (BWP)) that is operated according to one or more physical layer channels for a given radio access technology (for example, LTE, LTE-A, LTE-A Pro, NR). Each physical layer channel may carry acquisition signaling (for example, synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (for example, in a carrier aggregation configuration), a carrier may also have acquisition signaling or control signaling that coordinates operations for other carriers. A carrier may be associated with a frequency channel (for example, an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode, and initial acquisition and connection may be conducted by the UEs 115 via the carrier, or the carrier may be operated in a non-standalone mode and a connection is anchored using a different carrier (for example, of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (for example, in an FDD mode) or may be configured to carry downlink and uplink communications (for example, in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (for example, 1.4, 3, 5, 10, 15, 20, 40, or 80 megahertz (MHz)). Devices of the wireless communications system 100 (for example, the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (for example, a sub-band, a BWP) or all of a carrier bandwidth.

Signal waveforms transmitted over a carrier may be made up of multiple subcarriers (for example, using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (for example, a duration of one modulation symbol) and one subcarrier, in which the symbol period and subcarrier spacing are inversely related. The number of bits carried by each resource element may depend on the modulation scheme (for example, the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (for example, spatial layers or beams), and the use of multiple spatial layers may further increase the data rate or data integrity for communications with a UE 115.

One or more numerologies for a carrier may be supported, in which a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, in which $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (for example, 10 milliseconds (ms)). Each radio frame may be identified by a system frame number (SFN) (for example, ranging from 0 to 1023).

Each frame may include multiple consecutively numbered subframes or slots, and each subframe or slot may have the same duration. In some examples, a frame may be divided (for example, in the time domain) into subframes, and each subframe may be further divided into a number of slots. Alternatively, each frame may include a variable number of slots, and the number of slots may depend on subcarrier spacing. Each slot may include a number of symbol periods (for example, depending on the length of the cyclic prefix prepended to each symbol period). In some wireless communications systems 100, a slot may further be divided into multiple mini-slots containing one or more symbols. Excluding the cyclic prefix, each symbol period may contain one or more (for example, $N_f$) sampling periods. The duration of a symbol period may depend on the subcarrier spacing or frequency band of operation.

A subframe, a slot, a mini-slot, or a symbol may be the smallest scheduling unit (for example, in the time domain) of the wireless communications system 100 and may be referred to as a transmission time interval (TTI). In some examples, the TTI duration (for example, the number of symbol periods in a TTI) may be variable. Additionally or alternatively, the smallest scheduling unit of the wireless communications system 100 may be dynamically selected (for example, in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (for example, a control resource set (CORESET)) for a physical control channel may be defined by a number of symbol periods and may extend across the system bandwidth or a subset of the system bandwidth of the carrier. One or more control regions (for example, CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (for example, control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (for example, over a carrier) and may be associated with an identifier for distinguishing neighboring cells (for example, a physical cell identifier (PCID), a virtual cell identifier (VCID), or others). In some examples, a cell may also refer to a geographic coverage area 110 or a portion of a geographic coverage area 110 (for example, a sector) over which the logical communication entity operates. Such cells may range from smaller areas (for example, a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (for example, several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (for example, licensed, unlicensed) frequency bands as macro cells. Small cells may provide unrestricted access to the UEs 115 with service subscriptions with the network provider or may provide restricted access to the UEs 115 having an association with the small cell (for example, the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (for example, MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (for example, via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (for example, a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (for example, according to narrowband communications), or a combination of these techniques. For example, some UEs 115 may be configured for operation using a narrowband protocol type that is associated with a defined portion or range (for example, set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (for example, mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (for example, using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (for example, UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (for example, base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (for example, a mobility management entity (MME), an access and mobility management function (AMF)) and at least one user plane entity that routes packets or interconnects to external networks (for example, a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (for example, radio heads and ANCs) or consolidated into a single network device (for example, a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (for example, less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (for example, from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (for example, LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (for example, the same codeword) or different data streams (for example, different codewords). Different spatial layers may be associated with different antenna ports used for channel measurement and reporting. MIMO techniques include single-user MIMO (SU-MIMO), in which multiple spatial layers are transmitted to the same receiving device, and multiple-user MIMO (MU-MIMO), in which multiple spatial layers are transmitted to multiple devices.

Beamforming, which may also be referred to as spatial filtering, directional transmission, or directional reception, is a signal processing technique that may be used at a transmitting device or a receiving device (for example, a base station 105, a UE 115) to shape or steer an antenna beam (for example, a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (for example, with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (for example, antenna panels) to conduct beamforming operations for directional communications with a UE 115. Some signals (for example, synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (for example, by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (for example, a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (for example, by a base station 105 or a UE 115) may be performed using multiple beam directions, and the device may use a combination of digital precoding or radio frequency beamforming to generate a combined beam for transmission (for example, from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (for example, a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (for example, a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (for example, for identifying a beam direction for subsequent transmission or reception by the UE 115) or for transmitting a signal in a single direction (for example, for transmitting data to a receiving device).

A receiving device (for example, a UE 115) may try multiple receive configurations (for example, directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (for example, different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (for example, when receiving a data signal). The single receive configuration may be aligned in a beam direction determined based on listening according to different receive configuration directions (for example, a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A MAC layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. HARQ feedback is one technique for increasing the likelihood that data is received correctly over a communication link 125. HARQ may include a combination of error detection (for example, using a cyclic redundancy check (CRC)), forward error correction (FEC), and retransmission (for example, automatic repeat request (ARQ)). HARQ may improve throughput at the MAC layer in poor radio conditions (for example, low signal-to-noise conditions). In some examples, a device may support same-slot HARQ feedback, in which the device may provide HARQ feedback in a specific slot for data received in a previous symbol in the slot. In other cases, the device may provide HARQ feedback in a subsequent slot, or according to some other time interval.

Wireless communications system 100 may support feedback messaging such as HARQ feedback messaging for multicast transmissions. In some examples, a UE 115 that receives a multicast message from a base station 105 may fail to decode the multicast message from the base station 105, and the UE 115 may send a negative feedback message (such as a NACK) using configured network resources. The network resources may be shared resources, and multiple UEs 115 may use the shared resources (for example, shared PUCCH resources) to transmit respective feedback messages. In some examples, multiple UEs 115 may fail to decode the multicast message from the base station 105, and each of the multiple UEs 115 may send a NACK feedback message to the base station 105 using the shared resources.

The base station 105 may receive the NACK feedback messages from the multiple UEs 115, but may not be able to determine which or how many UEs 115 transmitted a NACK feedback message, and as such may not know which of the multiple UEs 115 failed to decode the multicast message. In some examples, the base station 105 may observe a low received power or an imbalance in received power from the multiple UEs 115, which may result in reduced likelihood of successful decoding of the feedback messages at the base station 105.

To increase communications reliability and quality, the wireless communications system 100 may support power control techniques for NACK feedback messages from multiple UEs 115 using shared resources. In some implementations, a UE 115 may determine a power control parameter such as a weighting factor "a" and multiplies the weighting factor $\alpha$ by a pathloss factor to determine transmit power. The weighting factor $\alpha$ may dynamically control or adjust transmit power as a function of pathloss. In another implementation, a UE 115 or base station 105 may adjust a power control parameter such as an open loop power control parameter (for example, by turning the open loop power control parameter on or off) based on signaling from the base station 105. Such signaling may be RRC signaling, a MAC control element (MAC-CE), or downlink control information (DCI). In some examples, determining to turn on (activate) or turn off (deactivate) the open loop power control parameter may be based on a channel quality at the UE 115 being above or below a channel quality threshold or based on whether a pathloss at the UE 115 is above or below a pathloss threshold.

In another implementation, the UE 115 may determine whether to transmit a feedback message in response to a multicast message from a base station 105 based on whether a signal quality parameter (for example, pathloss, SNR, reference signal received power (RSRP), reference signal received quality (RSRQ), signal to interference plus noise ratio (SINR)) is above or below a threshold. In addition, a base station 105 may configure a UE 115 with a power control parameter such as a probability factor and the UE 115 may use the probability factor to determine a probability threshold. Based on the probability threshold, a UE 115 may determine whether to transmit or refrain from transmitting a feedback message, which may reduce the number of UEs 115 using the shared feedback resources. In some other examples, different sets of shared resources may be associated with a group or zone of the wireless communications system 100 such that if a base station 105 receives a NACK feedback message over shared resources associated with a given zone, the base station 105 may adjust transmission parameters and perform a retransmission of the multicast message to UEs 115 located in the given zone.

Figure 2:
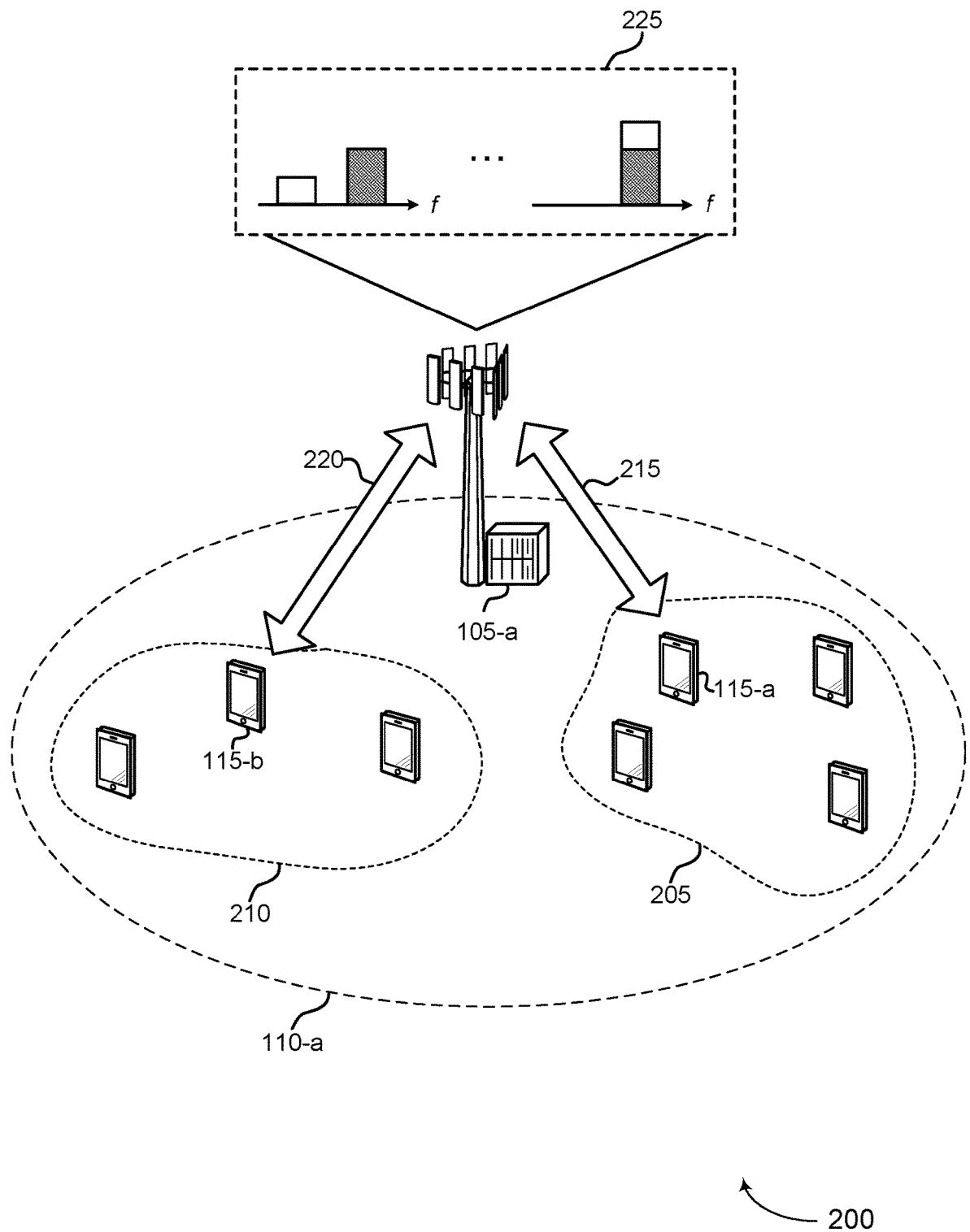
FIG. 2 illustrates an example of a wireless communications system that supports power control for shared feedback in accordance with aspects of the present disclosure.

FIG. 2 illustrates an example of a wireless communications system 200 that supports power control for shared feedback in accordance with aspects of the present disclosure. In some examples, wireless communications system 200 may implement aspects of wireless communications system 100. For example, wireless communications system 200 may include a number of network components such as base station 105-a and UEs 115-a and 115-b, each of which may be examples of base stations 105 and UEs 115 as described with reference to FIG. 1. In some examples, the base station 105-a may communicate with the UEs 115-a and 115-b using multicast data transmissions.

Wireless communications system 200 may support multicast communications, in which a base station 105-a transmits data to a multiple UEs 115 such as a group of UEs 115 or multiple groups of UEs 115 in the wireless communications system 200 (for example, UE multicast groups 205 and 210). Multicast communications may reduce signaling overhead and latency, and may increase communications efficiency in the wireless communications system 200. The wireless communications system 200 may also support feedback messages for a multicast message from the base station 105-*a*, such as HARQ feedback messages, to improve radio link reliability and cell-edge coverage for UEs 115 attempting to receive multicast messages.

According to some implementations, a UE 115 may use dedicated uplink resources (for example, UE-dedicated ACK/NACK resources such as PUCCH resources) for sending a respective feedback message (such as an ACK/NACK feedback message) in response to a multicast message from the base station 105-*a*. In such implementations, the base station 105-*a* may configure a resource for a UE 115 to use for transmitting a feedback message, and may transmit an indication of the configured resource to the UE 115. The UE 115 that receives a multicast message from the base station 105-*a* may transmit a feedback message for the multicast message using the configured resource. In some examples, a number (N) of UEs 115 may use up to N configured resources, and the UE 115 may not know whether the configured resources are shared among multiple UEs 115 or dedicated for the UE 115.

In another implementation, the base station 105-*a* may configure multiple UEs 115 (for example, a group of UEs such as UE multicast group 205 or UE multicast group 210) with a shared uplink resource such as a shared PUCCH to use for transmitting feedback messages. In some examples, the base station 105-*a* may configure each UE multicast groups 205 and 210 and corresponding members, or the UEs 115-*a* or UEs 115-*b* may autonomously configure UE multicast groups 205 and 210. The base station 105-*a* may transmit a multicast message to the UEs 115 in UE multicast group 205 using communications link 215, and the base station 105-*a* may transmit a multicast message to the UEs 115 in UE multicast group 210 using communications link 220. In some examples, the multicast message(s) may indicate resources for the UEs 115 in each group to use for feedback messages. For example, the base station 105-*a* may configure a first group of UEs (for example, UE multicast group 205) with a first shared resource, and may configure a second group of UEs (for example, UE multicast group 210) with a second shared resource.

In examples in which a UE 115 unsuccessfully decodes the multicast message or a decoding error or failure at the UE 115 occurs, the UE 115 may send a feedback message over a shared resource for the UE 115 to the base station 105-*a*. If decoding of the multicast message is successful, the UE 115 may not send a feedback message to the base station 105-*a*. The shared resource may be shared by multiple UEs 115, and in some implementations, the base station 105-*a* may determine to retransmit the multicast message to all or some UEs 115 in the wireless communications system 200, for example, based on receiving at least one feedback message from a UE 115 in the wireless communications system (for example, based on receiving at least one feedback message from a UE 115 of the UE multicast group 205 over the shared resources configured for the UE multicast group 205). The base station 105-*a*, however, may be unable to identify which UE 115 failed to receive the multicast message, and as such the base station 105-*a* may send a retransmission of the multicast message to all UEs 115 within the wireless communications system 200, or send a retransmission of the multicast message to UEs 115 within UE multicast group 205 or 210, instead of sending a retransmission of the multicast message to only the UE 115 (using specific precoders, MCS value, or other information) that sent the feedback message.

In some other multicast transmissions in which UEs 115 utilize shared resources (for example, UEs 115 in UE multicast groups 205 and 210), feedback messages from the UEs 115 may be non-coherently combined over the air. For example, signals may non-coherently combine such that the base station 105-*a* may be unable to accurately determine which UE 115 or how many UEs 115 failed to decode the multicast message. Additionally or alternatively, for examples in which each UEs 115, such as UEs 115 in a same UE multicast group) use the same or similar transmit power for feedback messages, the feedback message may destructively interfere over the air when multiple UEs 115 transmit feedback messages using the shared resources. A UE 115 may determine the transmit power for a HARQ-ACK feedback message for a unicast message based on a set of power control parameters including an open loop power control parameter and a pathloss weighting factor according to Equation 1 below.

$$P_{PUCCH,b,f,c}(i, q_u, q_d, l) = \min\left\{ \begin{array}{l} P_{CMAX,f,c}(i), \\ P_{0_{PUCCH},b,f,c}(q_u) + 10\log_{10}(2^\mu \cdot M^{PUCCH}_{RB,b,f,c}(i)) + PL_{b,f,c}(q_d) + \Delta_{F_{PUCCH}}(F) + \Delta_{TF,b,f,c}(i) + g_{b,f,c}(i, l) \end{array} \right\}$$

Equation 1

A base station 105-*a* may observe a weak received signal (for example, over the shared resources such as PUCCH resources) from the non-coherent combining of feedback messages from multiple UEs 115 based on a multicast message over the shared resources, and the base station 105-*a* may assume that a small number of UEs 115 (or no UEs 115) transmitted feedback messages, and as such, the base station 105-*a* may determine that the multicast message was received and decoded at the multiple UEs 115 successfully. In cases where non-coherent combining occurs, feedback message reliability may decrease for UEs 115 in a UE multicast group 205 or 210 that transmit respective feedback messages for the multicast message but do not receive a retransmission of the multicast message from the base station 105-*a*.

The base station 105-*a* may implement various multiplexing techniques 225 to receive transmissions from the UE multicast groups 205 and 210. In some examples, the base station 105-*a* may use code division multiplexing (CDM) or FDM for different resources associated with the UE multicast groups 205 or 210. In either multiplexing example, multiple UEs 115-*a* from UE multicast group 205 may transmit NACK feedback messages using a first transmit power over first shared resources for the UE multicast group 205, and multiple UEs 115-*b* from UE multicast group 210 may transmit NACK feedback messages using a second transmit power using second shared resources for the UE multicast group 210. In some examples, however, the NACK feedback messages may be non-coherently combined over the air, and may cause the received power for the NACK feedback messages received by the base station 105-*a* on different ones of the first and second shared resources to be imbalanced, or otherwise incorrectly received by the base station 105-*a*. In addition, some multiplexing processes 225 over the shared resources may not be usable for feedback messages from multiple UEs 115 using the same shared resource.

Wireless communications system 200 may support various transmit power control techniques for feedback messages from one or more UEs, such as NACK feedback messages over PUCCH resources. In some examples, a power control parameter such as a transmit power weighting factor alpha (α) may be used in an equation that a UE 115 uses to determine transmit power for the feedback message over PUCCH resources. The weighting factor α may adjust power control over the PUCCH resources for UEs 115 in using shared resources for feedback message.

For example, α may be included as a weighting factor associated with the pathloss term $PL_{b,f,c}(q_d)$ in a PUCCH power control equation, according to Equation 2 below.

measured signal value being higher than the threshold signal value. In other examples, the UE 115 may measure a signal value that is lower than the threshold signal value, and the UE 115 may not transmit a NACK feedback message.

In some other implementations, wireless communications system 200 may support use of a power control parameter such as a probability factor to limit the number of UEs 115 using the same shared resource for transmitting feedback messages. For example, a UE 115 may determine whether to transmit a NACK feedback message based on a particular probability p if the UE 115 fails to decode the multicast message. In some examples, the probability p of transmitting a NACK feedback message by a UE 115 may be based on whether the measured signal value is higher or lower than the threshold signal value. In some examples, the probability p may change based on whether the measured signal value is higher or lower than the threshold signal value. For example, a UE 115 may be associated with a threshold number of RSRP values, and in cases in which RSRP at the UE 115 is greater than a first threshold (Th1), the probability p may be zero (p=0), and the UE 115 may not transmit a NACK feedback message using shared PUCCH resources.

$$P_{PUCCH,b,f,c}(i, q_u, q_d, l) = \min\left\{ \begin{array}{l} P_{CMAX,f,c}(i), \\ P_{0_{PUCCH},b,f,c}(q_u) + 10\log_{10}(2^\mu \cdot M_{RB,b,f,c}^{PUCCH}(i)) + \alpha PL_{b,f,c}(q_d) + \Delta_{F_{PUCCH}}(F) + \Delta_{TF,b,f,c}(i) + g_{b,f,c}(i,l) \end{array} \right\} \quad \text{Equation 2}$$

In some examples, the weighting factor α may be associated with pathloss such that adjusting α may adjust the power control composition and transmit power based on pathloss conditions. The weighting factor α may be a fractional value or an integer value (for example, α may be 0, 1, a fractional value between 0 and 1 such as 0.4, 0.5, 0.6, 0.7, 0.8, or 0.9, or α may be a value greater than 1). The wireless communications system 200 may support fractional transmit power control, for example, such as fractional transmit power control for a physical uplink shared channel (PUSCH), which may configure a as an RRC parameter.

In some other implementations, the received power of the feedback messages from multiple UEs 115 (for example, NACK feedback messages over shared PUCCH resources) may be different for different UEs 115 such as UEs 115 having an a that is set to be greater than 1, or for UEs 115 in which a power control parameter is turned off (for example, in which open loop power control is turned off or deactivated for the UE 115, or a different open loop power control parameter is used). In such implementations, the received feedback messages sent from the different UEs 115 over the shared PUCCH resources, such as a UE 115 transmitting a feedback message without power control, may cause power fluctuations or interference at the base station 105-*a*. To reduce power fluctuations and interference, a UE 115 may be determine a threshold signal value or threshold channel quality value (for example, a threshold pathloss, RSRP, RSRQ, or SINR value) that the UE 115 may use to determine whether to transmit a NACK feedback message using PUCCH resources for UE shared-NACK feedback.

In some examples, the UE 115 may fail to decode a multicast message from the base station 105-*a* and may measure a signal value (for example, a pathloss, RSRP, RSRQ, or SINR value) that is higher than the threshold signal value, and the UE 115 may transmit a NACK feedback message using the PUCCH resources based on the In cases in which the RSRP at the UE 115 is greater than a second threshold (Th2), the probability p may be a different value (p>0), and the UE may transmit a NACK feedback message using the shared PUCCH resources according to the probability p. In cases in which the RSRP at the UE 115 is between the first threshold and the second threshold, the UE 115 may determine the probability p according to Equation 3 below.

$$p = \frac{(Th1 - RSRP)}{2(Th1 - Th2)} \quad \text{Equation 3}$$

In some implementations, a UE 115 may override a probability p if the UE 115 performs multiple attempts to transmit a NACK feedback message but based on the probability p determines not to transmit the NACK feedback message. For example, if the UE 115 tries in a first attempt to transmit a NACK feedback message but is unable to send a NACK feedback message based on the probability p, the UE 115 may override the probability p and transmit a NACK feedback message in a subsequent attempt such that the subsequent attempt is guaranteed (for example, probability p is 1 or 100%). The subsequent attempt may be based on a number of decoding failures, for example, after 1, 2, 4, 7, or other number of decoding failures at the UE 115, the UE 115 may override probability p and determine to transmit the NACK feedback message.

In some examples, the UE multicast groups 205 and 210 may correspond to different zones, and each zone may be associated with different parameters. For example, each zone may be characterized by one or more parameters such as location, beam, sectorization, angle, or distance, among other examples. In addition, each zone may have one or multiple different pathloss, RSRP, RSRQ, or SINR ranges, transmit power levels, reference signal identifier (RS-ID), beam indices, sector indices, cell indices, transmission configuration indicator (TCI) states, among other examples.

In some examples, each UE 115 may determine the zone to which each UE 115 belongs (for example, in which each zone corresponds to one of UE multicast group 205 or 210), and in other examples, the base station 105-a may determine respective zones for each of the multiple UEs 115. Each UE 115 may be associated with a zone using a zone-ID or an identifier specific to the zone to which the UE 115 belongs. For example, a UE 115-a belonging to UE multicast group 205 may use a different zone-ID than a UE 115-b belonging to UE multicast group 210. In some implementations, the UE 115 may be a member of more than one zone, and as such, may use multiple zone-IDs. In some cases, the UE 115 may transmit an indication to the base station 105-a indicating which zone or zones to which the UE 115 belongs.

Further, each zone may be associated with different resources (for example, respective shared resources such as shared PUCCH resources for each zone). If the base station 105-a receives a NACK feedback message from a given zone, the base station 105-a may adjust transmission parameters for retransmission of the multicast message for the given zone and perform retransmission of the multicast message using the adjusted transmission parameters. In some examples, the base station 105-a may adjust other signaling or channel quality parameters, such as pathloss, RSRP, RSRQ, or SINR ranges, or thresholds on a per zone basis.

Figure 3:
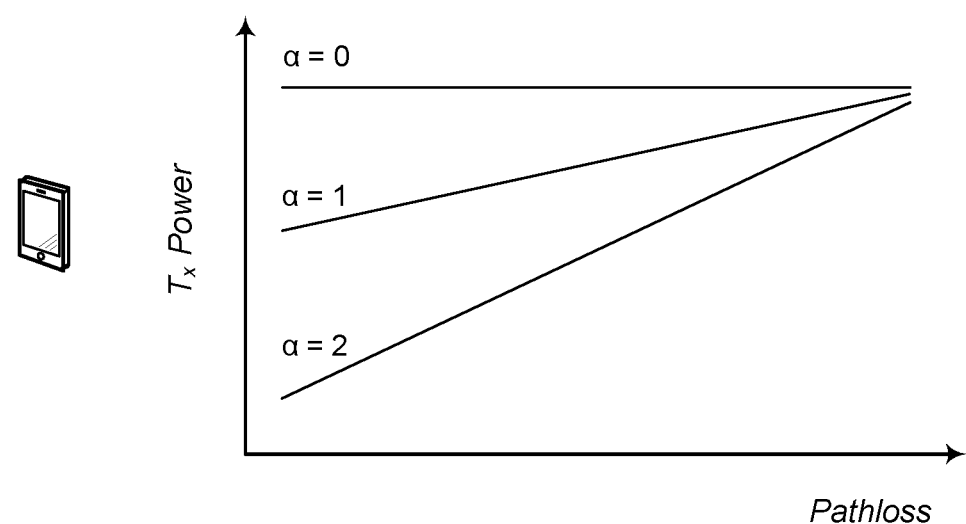
FIG. 3 illustrates example graphs for transmit and receive power as a function of pathloss that support power control for shared feedback in accordance with aspects of the present disclosure.
Figure 3:
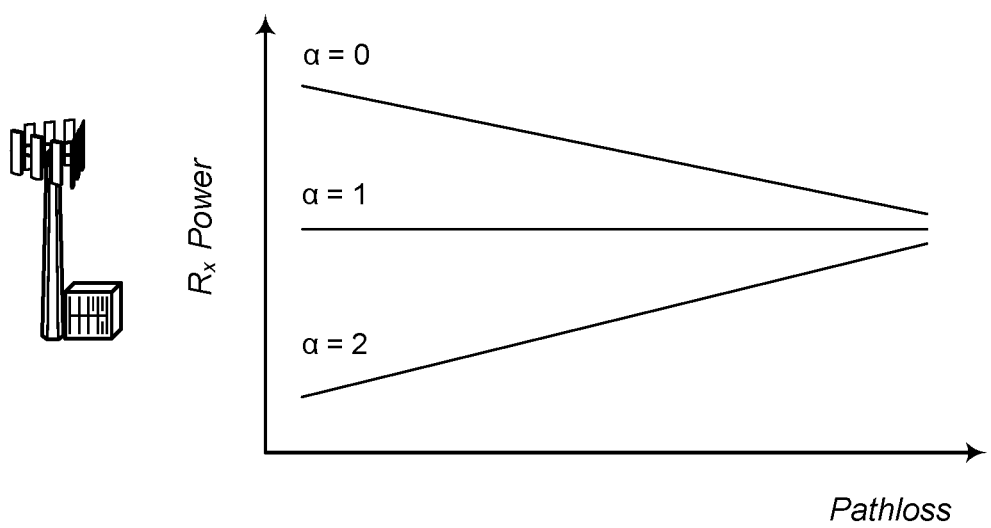

FIG. 3 illustrates example graphs 300-a and 300-b showing transmit and receive power as a function of pathloss that support power control for shared feedback in accordance with aspects of the present disclosure. In some implementations, example graphs 300-a and 300-b may implement aspects of wireless communications systems 100 or 200. For example, the transmit power in example graph 300-a may correspond to determinations of transmit power at a UE 115, and the receive power in example graph 300-b may be determinations of receive power at a base station 105.

In some implementations, a base station may determine a value of a power control parameter such as a weighting factor $\alpha$, and may be transmit the weighting factor to the UE via RRC signaling such as dedicated RRC signaling, or other control signaling. In some other cases, a UE may configure the weighting factor $\alpha$. The weighting factor $\alpha$ for PUCCH power control may be different from a parameter a used for PUSCH. The UE may use a PUCCH transmit power equation that includes the weighting factor $\alpha$ for PUCCH transmissions and may determine a transmit power for transmitting a feedback message in response to a multicast message from the base station. In some other examples in which the UE transmits a PUCCH (for anything other than UE-shared NACK, or cases in which the UE is not configured with the parameter a), the UE may use the PUCCH power equation given by Equation 1 that does not include the weighting factor $\alpha$. Additionally or alternatively, the weighting factor $\alpha$ in such examples may be set to 1. Further, the UE may use the equation for PUSCH (which may or may not include the parameter a, for example, Equation 1 or Equation 2) when the UE performs a PUSCH transmission.

In some implementations, the value of the weighting factor $\alpha$ may be depend on various communications parameters, including pathloss. For example, the weighting factor $\alpha$ may be set to 0, and the transmit power at the UE may not depend on a pathloss between the UE and the base station (for example, the transmit power may remain constant for $\alpha=0$ as the pathloss increases, that is, the transmit power may be represented by a flat line in graph 300-a for $\alpha=0$). In such examples, however, the received power at the base station may depend on the pathloss between the UE and the base station (for example, the received power may decrease as the pathloss changes, showing a decreasing slope for received power as a function of pathloss on graph 300-b for $\alpha=0$).

In another example, the weighting factor $\alpha$ may be set to 1, and the transmit power at the UE may depend on the pathloss between the UE and the base station (for example, the transmit power may increase as pathloss increases, showing an increasing slope for received power as a function of pathloss on graph 300-a for $\alpha=1$). In such examples, the received power at the base station may not depend on the pathloss between the UE and the base station (for example, the receive power remains constant as pathloss changes, or showing a slope for received power that remains constant as a function of pathloss at graph 300-b for $\alpha=0$).

In another example, the weighting factor $\alpha$ may be set to a value greater than 1 (for example, $\alpha=2$), and both the transmit power at the UE and the receive power at the base station may depend on the pathloss between the UE and the base station. For example, both the transmit power at the UE and the receive power at the base station may increase as pathloss increases, showing an increasing slope for received power as a function of pathloss on both graphs 300-a and 300-b for $\alpha=2$.

In some aspects, signals from some UEs that experience high values of pathloss or that are farther away from the base station may have increased transmit power as the value of $\alpha$ increases, which may improve the likelihood of successful reception at the base station of a NACK feedback message from the UE. The UEs that experience low values of pathloss or that are close to the base station may have lower transmit power as $\alpha$ increases, which may conserve battery power. In addition, the initial transmit power $P_0$ may be adjusted such that signal noise parameters are less than or equal to a threshold value (for example, a threshold SINR or SNR value).

Figure 4:
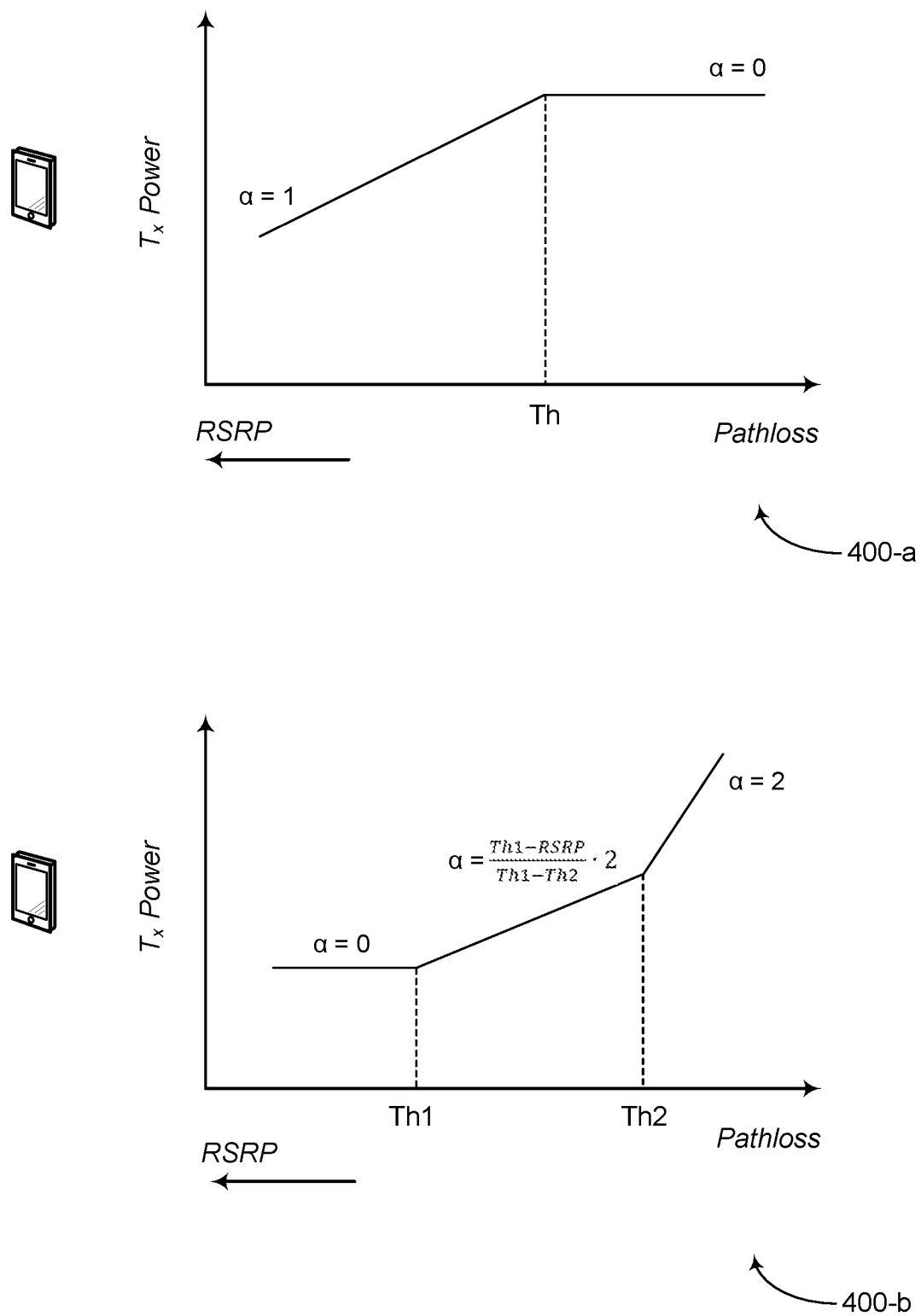
FIG. 4 illustrates example graphs for transmit power as a function of pathloss that support power control for shared feedback in accordance with aspects of the present disclosure.

FIG. 4 illustrates example graphs 400-a and 400-b showing transmit power as a function of pathloss that support power control for shared feedback in accordance with aspects of the present disclosure. In some implementations, example graphs 400-a and 400-b may implement aspects of wireless communications systems 100 or 200. For example, the transmit power in example graphs 400-a and 400-b may correspond to measurements at one or multiple UE 115.

In some implementations, a wireless communications system may support both enabling and disabling (for example, turning on and turning off) open loop power control using a number of techniques. In some examples, a power control parameter may enable open loop power control to be turned off using an RRC configuration in which the base station sends an RRC configuration message to a UE to activate or deactivate open loop power control at the UE. In some implementations, the RRC configuration message may indicate a weighting factor $\alpha$ value of zero. In some other examples, implementing RRC messaging to turn off open loop power control may not change the PUCCH transmit power-control equation.

In another example, open loop power control may be activated (turned on or off) by a MAC-CE (or other higher layer signaling) in which a base station transmits a downlink shared channel such as a PDSCH that includes a MAC-CE that activates or deactivates open loop power control. In some other examples, open loop power control may be activated (turned on or off) based on DCI or other control signaling in which a base station transmits DCI to the UE in a physical downlink control channel (PDCCH) to activate or deactivate open loop power control.

When open loop power control is activated or turned on, a transmit power for a feedback message may increase with higher levels of pathloss between a UE and a base station. In examples that open loop power control is turned off, the transmit power for the feedback message may be independent of pathloss such that higher or lower levels of pathloss may not substantially affect the transmit power. In some other examples, the UE may determine to turn off or turn on the open loop power control based on a condition or threshold value (Th) such as a pathloss threshold value. In some examples, a condition may be based on or determined by transmit power or a transmit power equation. For example, for implementations in which the transmit power is above a threshold value, the UE may determine to turn off open loop power control or the UE may set α=0, and for implementations in which the transmit power is below the threshold value, the UE may determine to turn on open loop power control, or the UE may set α=1. In such examples, a base station may determine the threshold value an indicate the threshold value to the UE through higher layer signaling (for example, MAC-CE, RRC). Additionally or alternatively, the threshold transmit power value may be equal to the maximum power of an uplink carrier ($P_{CMAX,c}$) used by the UE for transmitting the feedback message or a maximum transmit power of the UE ($P_{CMAX}$).

In some other implementations, the UE may determine whether to turn on or turn off open loop power control by measuring channel quality (for example, RSRP, RSRQ, SINR, channel quality indicator (CQI) values) and comparing the measured channel quality to a channel quality threshold. In such examples, a base station 105 may configure the UE with one or more channel quality thresholds through higher layer signaling. In some implementations, a UE may determine a value for α based on whether a channel quality is higher or lower than the channel quality threshold. In the example of graph 400-a, α may be set to equal 0 up to a given RSRP threshold value (Th), and a transmit power for PUCCH may remain constant as pathloss increases. When RSRP exceeds the threshold value (Th), α may be set to 1, and the transmit power for PUCCH may increase as pathloss increases.

In some other implementations, such as in graph 400-b, α may be set equal to 2 for pathloss greater than an RSRP threshold value (Th2), and the value of transmit power for PUCCH may increase as pathloss increases. When RSRP is less than another threshold value (Th1), α may be set equal to 0, and the value of transmit power for PUCCH may remain constant as pathloss increases. In examples in which the RSRP and pathloss are between the Th1 and Th2, α may be based on Equation 4 below.

$$\alpha = \frac{(Th1 - RSRP)}{2(Th1 - Th2)} \quad \text{Equation 4}$$

In such examples, the value of transmit power for PUCCH may increase as pathloss increases. According to some aspects, the UE may be capable of setting or adjusting α dynamically according to various measured parameters.

Figure 5:
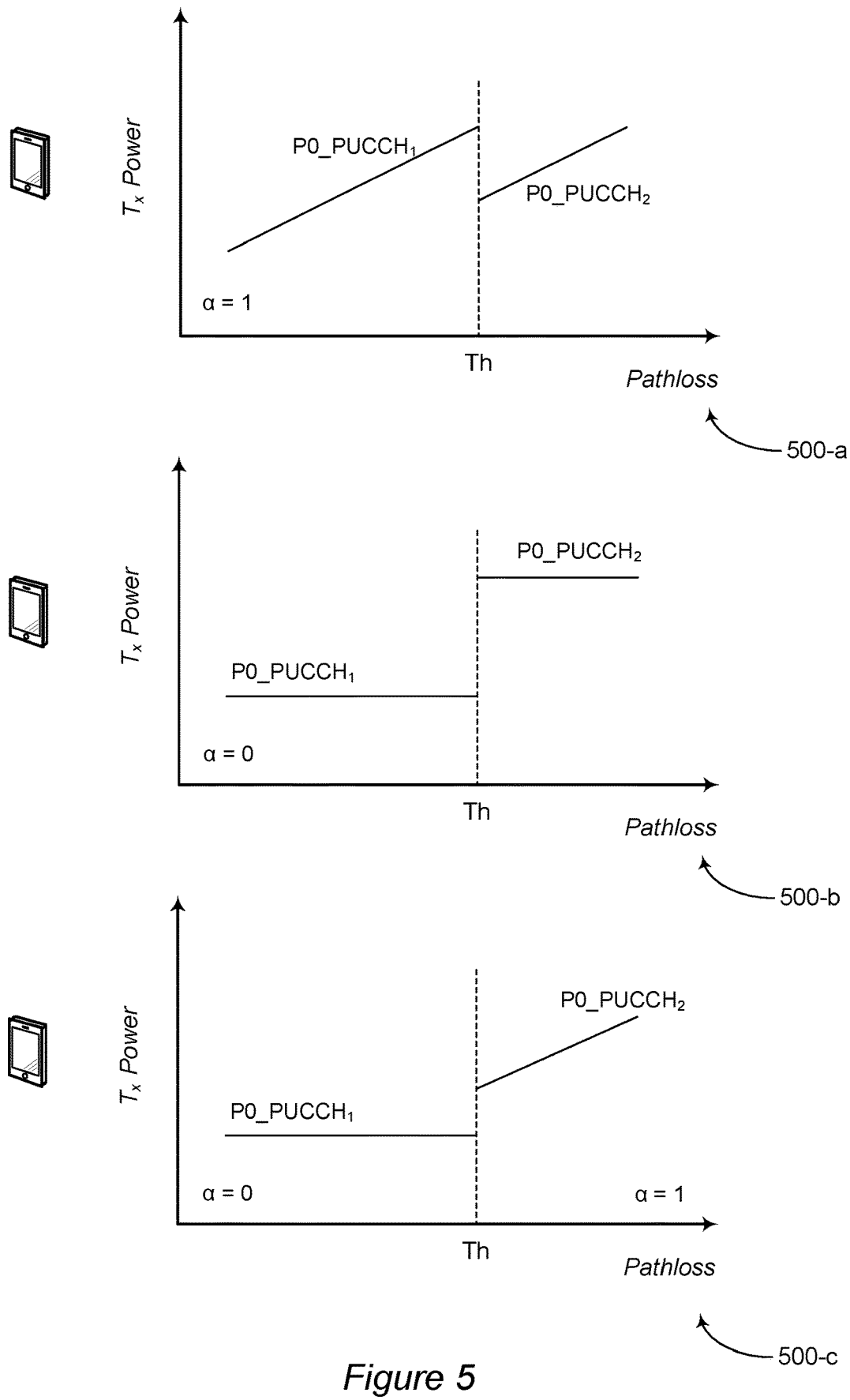
FIG. 5 illustrates additional examples of graphs for transmit power as a function of pathloss that support power control for shared feedback in accordance with aspects of the present disclosure.

FIG. 5 illustrates example graphs 500-a, 500-b, and 500-c showing transmit power as a function of pathloss that support power control for shared feedback in accordance with aspects of the present disclosure. In some implementations, example graphs 500-a, 500-b, and 500-c may implement aspects of wireless communications system 100. For example, the transmit power in example graphs 500-a, 500-b, and 500-c may correspond to measurements at one or multiple UE 115.

In addition to supporting different values for α, a UE may support different power control parameters including open loop power control parameters such as P0_PUCCH, which may be used to adjust PUCCH transmit power. The base station may determine different values of P0_PUCCH and the base station may configure a UE with a given value for P0_PUCCH, or the UE may determine a P0_PUCCH value to use based on various conditions. For example, P0_PUCCH may change based on a channel quality, a threshold channel quality, or a pathloss value. In some implementations, the value for α may remain constant as P0_PUCCH changes, and in some other cases, the value for α may change as P0_PUCCH changes.

In the example of graph 500-a, α may be set to 1, and P0_PUCCH may have a first value (for example, P0_PUCCH$_1$). The transmit power may increase as pathloss increases up to a threshold value (Th). In the example of graph 500-a, the value for P0_PUCCH may change (for example, the value of P0_PUCCH$_1$ may change to P0_PUCCH$_2$) when the threshold Th is exceeded, and the value of α may not change. For examples in which the P0_PUCCH=P0_PUCCH$_2$, and α is equal to 1, the PUCCH transmit power may increase as pathloss increases.

In the example of graph 500-b, α may be set to 0, and P0_PUCCH may have a first value (for example, P0_PUCCH$_1$). The transmit power may be constant as pathloss increases up to a threshold value (Th). In the example of graph 500-b, the value for P0_PUCCH may change (for example, the value of P0_PUCCH$_1$ may change to P0_PUCCH$_2$) when the threshold Th is exceeded, and the value of α may not change. For examples in which the P0_PUCCH=P0_PUCCH$_2$, and α is equal to 0, the PUCCH transmit power may remain constant as pathloss increases.

In the example of graph 500-c, α may be set to 0, and P0_PUCCH may have a first value (for example, P0_PUCCH$_1$). The transmit power may be constant as pathloss increases up to a threshold value (Th). In the example of graph 500-b, the value for P0_PUCCH may change (for example, the value of P0_PUCCH$_1$ may change to P0_PUCCH$_2$) when the threshold Th is exceeded, and the value of α may also change so that α may be set to 1 after the threshold Th is exceeded. For examples in which the P0_PUCCH=P0_PUCCH$_2$, and α is equal to 1, the PUCCH transmit power may increase as pathloss increases.

In some other examples, P0_PUCCH may change by modifying the PUCCH power equation according to a combination of P0_PUCCH and the weighting factor α (for example, {P0_PUCCH, α}). In some implementations, the combination of P0_PUCCH and the weighting factor α may reduce or minimize the received power at the base station. For example, a UE or base station may determine a minimum value for the PUCCH received power using a combination of equations containing P0_PUCCH and a components. The equations within the maximum $P_{CMAX,f,c}(i)$ are differentiated by P0_PUCCH and α according to Equation 5 below:

$$P_{PUCCH,b,f,c}(i, q_u, q_d, l) = \qquad\qquad\text{Equation 5}$$

$$\min\left\{\begin{array}{l} P_{CMAX,f,c}(i), \\ \max\left\{\begin{array}{l} P_{0_{PUCCH},min,b,f,c}(q_u) + 10\log_{10}(2^\mu \cdot M_{RB,b,f,c}^{PUCCH}(i)) + PL_{b,f,c}(q_d) + \Delta_{F_{PUCCH}}(F) + \Delta_{TF,b,f,c}(i) + g_{b,f,c}(i, l) \\ P_{0_{PUCCH},b,f,c}(q_u) + 10\log_{10}(2^\mu \cdot M_{RB,b,f,c}^{PUCCH}(i)) + \alpha PL_{b,f,c}(q_d) + \Delta_{F_{PUCCH}}(F) + \Delta_{TF,b,f,c}(i) + g_{b,f,c}(i, l) \end{array}\right\} \end{array}\right\}$$

In some implementations in which α is set to 0, the received PUCCH power at the base station may depend on pathloss such that increased pathloss may reduce the received power at the base station. In some other implementations in which α is set to 1, the received power at the base station may be independent of the pathloss value, and may remain constant as pathloss increases. In some other implementations in which α is set to a value greater than 1 (for example, α=2), the received power may depend on pathloss, such that the received power may increase as pathloss increases (for example, as the UE gets spatially distant from the base station), and the received power may decrease as pathloss decreases (for example, as the UE gets spatially close to the base station).

Figure 6:
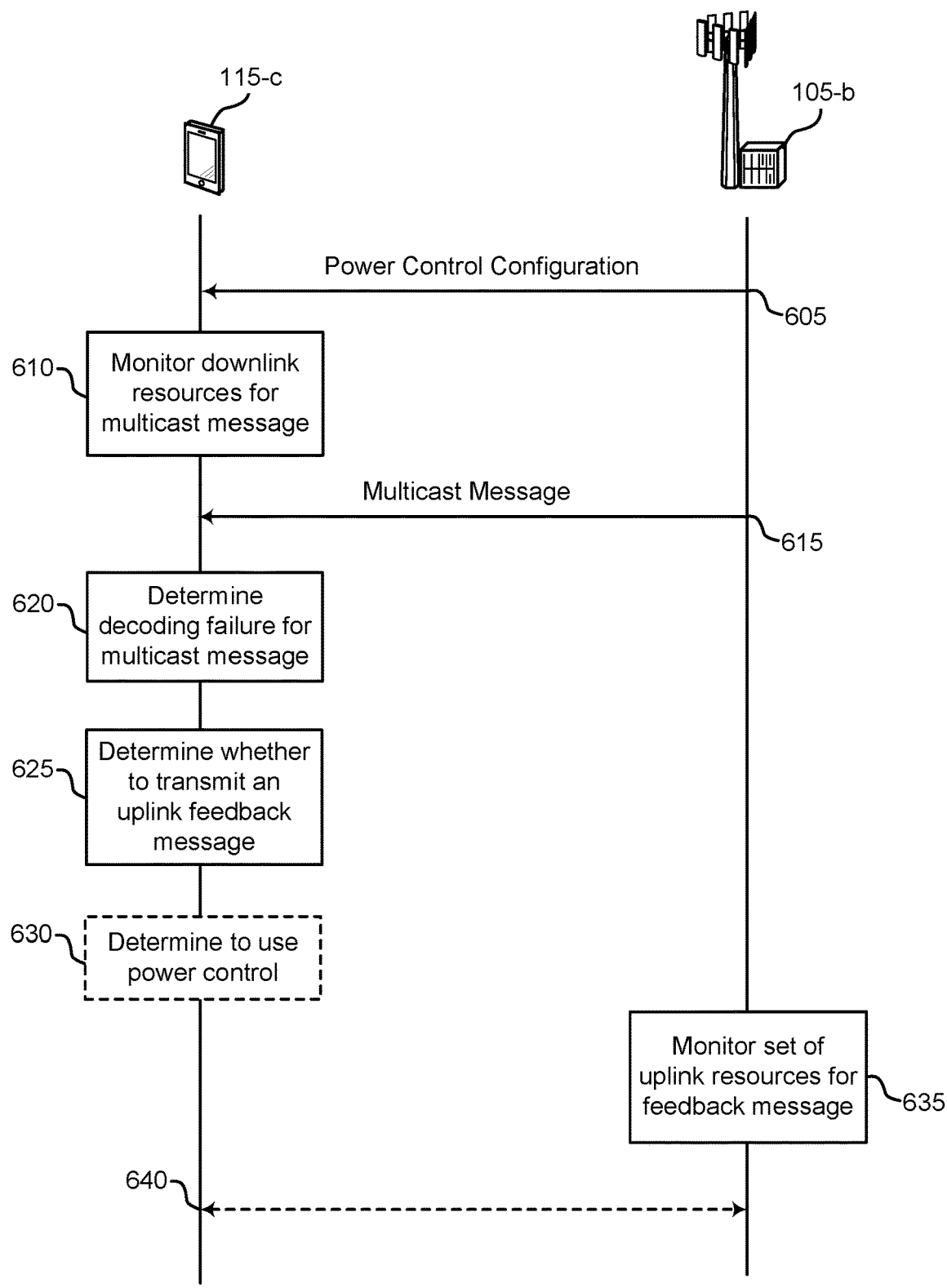
FIG. 6 illustrates an example of a process flow that supports power control for shared feedback in accordance with aspects of the present disclosure.

FIG. 6 illustrates an example of a process flow 600 that supports power control for shared feedback in accordance with aspects of the present disclosure. In some examples, process flow 600 may implement aspects of wireless communications systems 100 or 200. For example, process flow 600 may include communications between a UE 115-c and a base station 105-b, which may be examples of UEs 115 and base stations 105 described with reference to FIG. 1.

At 605, the base station 105-b may transmit, and the UE 115-c may receive, an indication of a power control configuration for feedback for multicast communications. The power control configuration may indicate one or more power control parameters for uplink feedback for a group of UEs, including the UE 115-c. In some implementations, the base station 105-b may transmit the indication of the power control configuration via RRC signaling, a MAC-CE, or in DCI.

At 610, the UE 115-c may monitor a set of downlink resources for the multicast message from the base station 105-b. In some implementations, the set of downlink resources may be a set of multicast-broadcast resources configured by the base station 105-b for sending multicast data to a set of UEs including UE 115-c. At 615, the base station 105-b may transmit the multicast message to the group of UEs including UE 115-c.

At 620, the UE 115-c may determine whether there is a decoding failure for the multicast message based on monitoring the set of downlink resources. At 625, the UE 115-c may determine, based on the one or more power control parameters, whether to transmit the uplink feedback message (for example, a NACK) indicating the decoding failure to the base station 105-b. In some implementations, the UE 115-c may determine whether to transmit the uplink feedback message using a set of uplink resources allocated to the group of UEs including the UE 115-c.

At 630, the UE 115-c may determine whether to implement a number of different power control operations for transmitting the uplink feedback message to the base station 105-b, for example, the UE 115-c may implement a number of power control parameters based on the power control configuration. In some implementations, the UE 115-c may determine a power control parameter such as a weighting factor (for example, a weighting factor α) for an uplink control channel (for example, a PUCCH) based on the power control configuration. In some examples, the UE 115-c may determine the weighting factor from a set of weighting factors based on various channel quality parameters associated with the UE 115-c. For example, the channel quality parameters may be one or more of a pathloss, a SINR, a SNR, a RSRP, a RSRQ, or a CQI.

As described above, the weighting factor may be a fractional value or an integer value, and in some examples, the weighting factor may be greater than 1. The weighting factor for the control channel (for example, a PUCCH) may in some examples be different than an α value for an uplink shared channel transmission (for example, a PUSCH). In some examples, the weighting factor may be a power control parameter which scales the transmit power of a PUCCH transmission based on a pathloss associated with the PUCCH transmission.

The UE 115-c may determine the value of the weighting factor, and in some other examples the UE 115-c may receive an indication of the weighting factor from the base station 105-b. In such latter examples, the base station 105-b may determine the weighting factor of the one or more power control parameters for a transmit power of the UE 115-c, and may include an indication of the weighting factor for the transmit power in the multicast message to the UE 115-c that includes the indication of the power control configuration. In some other examples, the base station 105-b may determine the weighting factor from the set of weighting factors based on a CQI. For example, the base station 105-b may receive a report including a CQI from at least one UE of the group of UEs, and may determine the weighting factor for the transmit power for the at least one UE based on the CQI.

In some examples, the base station 105-b may determine the one or more power control parameters to be one or more channel quality thresholds transmitted to the UE 115-c. In such examples, one or more channel quality thresholds may correspond to one or more weighting factors. For example, based on a weighting factor, the UE 115-c may determine a transmit power from a set of transmit powers for the uplink feedback message.

In another example, the UE 115-c may activate uplink power control based on the power control configuration corresponding to a first set of open-loop power control parameters of the set of power control parameters. The first set of open-loop power control parameters may be different than a second set of open-loop power control parameters associated with deactivation of the uplink power control.

In some examples, the UE 115-c may determine the one or more power control parameters as a transmit power threshold, and may determine a transmit power for the uplink feedback message based on the transmit power threshold. The transmit power threshold may correspond to a maximum power of an uplink carrier configured for the UE 115-c, or a maximum power capability of the UE 115-c. In some implementations, the UE 115-c may activate uplink power control based at least in part on a comparison of the transmit power to the transmit power threshold, and communicate with the base station 105-b based on activating the uplink power control.

In some examples, the one or more power control parameters may include a transmit power threshold, and the base station 105-b may determine the transmit power threshold of the one or more power control parameters associated with the activation of uplink power control. The base station 105-b may transmit the indication of the power control configuration which includes the transmit power threshold. The UE 115-c may receive the indication of the transmit power threshold from the base station 105-b and may determine the transmit power threshold based on the indication of the transmit power threshold.

In some other examples, the base station 105-b may include one or more channel quality thresholds of the one or more power control parameters, in which the one or more channel quality thresholds correspond to different open loop power control parameters. The base station 105-b may transmit the indication of the power control configuration including the one or more channel quality threshold values to the UE 115-c.

In some examples, the UE 115-c may determine that a channel quality parameter (for example, a pathloss value, an RSRP value, an RSRQ value, or an SINR value) that exceeds a channel quality threshold. The UE 115-c may determine a transmit power from a set of transmit powers for the uplink feedback message using a first power control parameter of the one or more power control parameters for uplink feedback based on the channel quality parameter exceeding the channel quality threshold. In another implementation, the UE 115-c the channel quality parameter is within a range between the channel quality threshold and a second channel quality threshold, and the UE 115-c may determine the transmit power for the uplink feedback message using a second power control parameter of the one or more power control parameters for uplink feedback different than the first power control parameter based on the channel quality parameter being within the range.

In another example implementation, the UE 115-c may determine that the channel quality parameter crosses or exceeds a channel quality threshold, and the UE 115-c may determine to refrain from transmitting the uplink feedback message based on the channel quality parameter of the UE 115-c crossing or exceeding the channel quality threshold. In some examples, the first and second power control parameters may each be one of a weighting factor or an open loop power control parameter. In some other examples, the UE 115-c may determine a set of power control parameters for the transmit power of the uplink feedback message based on a configured receive power of the base station 105-b.

In some examples, the UE 115-c may select an open loop power control parameter from a set of open loop power control parameters of the one or more power control parameters, and the UE 115-c may select a weighting factor from a set of weighting factors of the one or more power control parameters. The UE 115-c may determine a transmit power from a set of transmit powers for the uplink feedback message based on both the open loop power control parameter and a weighing factor.

In another power control operation example, the one or more power control parameters may include a probability factor, and the UE 115-c may determine whether to transmit the uplink feedback message based on the probability factor. In some implementations, the base station 105-b may transmit a probability factor or a probability threshold of the one or more power control parameters (or an indication of the probability factor or probability threshold) to the UE 115-c. The UE 115-c may receive the indication of the probability factor from the base station 105-b, and may determine the probability factor based on receiving the indication. Additionally or alternatively, the UE 115-c may determine the probability factor based on the channel quality parameter of the UE 115-c.

In some implementations, the UE 115-c may have a probability threshold value, and may determine that a number of decoding failures at the UE 115-c satisfies the probability threshold. The UE 115-c may in some examples transmit an uplink feedback message based on the number of decoding failures satisfying the probability threshold.

In another power control operation example, the UE 115-c may be within a zone of a number of multicast zones, and the UE 115-c may determine a set of uplink resources to use for transmitting the uplink feedback message based on the zone. In some examples, the base station 105-b may transmit an indication of a zone of the number of multicast zones in which the UE 115-c is located. The base station 105-b may transmit, and the UE 115-c may receive, an indication of the zone or a zone identifier, and determining that the UE 115-c corresponds to the zone is based on the indication of the zone or the zone identifier. A multicast zone may be associated with one or more of a respective location, a respective beam, a respective sector, a respective angle, a respective distance, a respective channel quality parameter, or a respective transmission configuration indicator state.

At 635, the base station may monitor the set of uplink resource allocated to one or more of the group of UEs including the UE 115-c for an uplink feedback message. At 640, the UE 115-c may communicate with the base station 105-b based on determining whether to transmit the uplink feedback message indicating the decoding failure. The UE 115-c may communicate with the base station 105-b by transmitting the uplink feedback message according to one or more power control operations described herein. For example, communicating with the base station 105-b may include transmitting the uplink feedback message in the uplink control channel via the set of uplink resources based on the determined transmit power.

Figure 7:
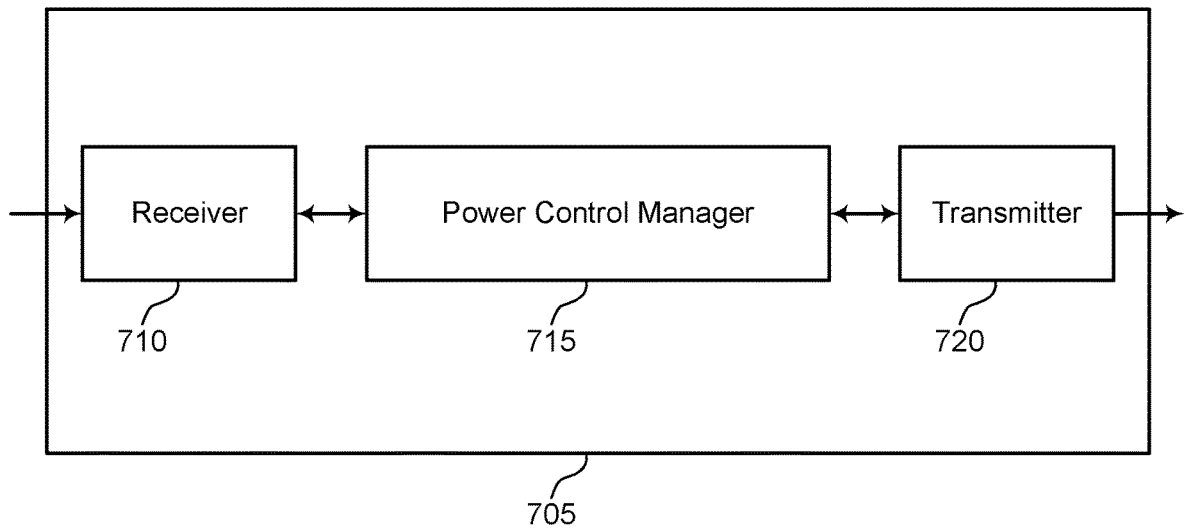
FIGS. 7 and 8 show block diagrams of devices that support power control for shared feedback in accordance with aspects of the present disclosure.

FIG. 7 shows a block diagram of a device 705 that supports power control for shared feedback in accordance with aspects of the present disclosure. The device 705 may be an example of aspects of a UE 115 as described herein. The device 705 may include a receiver 710, a power control manager 715, and a transmitter 720. The device 705 can be implemented, at least in part, by one or both of a modem and a processor. Each of these components may be in communication with one another (for example, via one or more buses).

The receiver 710 may receive information such as packets, user data, or control information associated with various information channels (for example, control channels, data channels, and information related to power control for shared feedback). Information may be passed on to other components of the device 705. The receiver 710 may be an example of aspects of the transceiver 1020 described with reference to FIG. 10. The receiver 710 may utilize a single antenna or a set of antennas.

The power control manager 715 may receive, from a base station, a power control configuration indicating one or more power control parameters for an uplink feedback message associated with a multicast message, monitor a set of downlink resources for the multicast message from the base station, determine a decoding failure for the multicast message based on the monitoring, determine, based on the one or more power control parameters, whether to transmit the uplink feedback message indicating the decoding failure via a set of uplink resources allocated to a group of UEs including the UE, and communicate with the base station based on determining whether to transmit the uplink feedback message indicating the decoding failure. The power control manager 715 may be an example of aspects of the power control manager 1010 described herein.

The power control manager 715, or its sub-components, may be implemented in hardware, code (for example, software or firmware) executed by a processor, or any combination thereof. If implemented in code executed by a processor, the functions of the power control manager 715, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The transmitter 720 may transmit signals generated by other components of the device 705. In some examples, the transmitter 720 may be collocated with a receiver 710 in a transceiver component. For example, the transmitter 720 may be an example of aspects of the transceiver 1020 described with reference to FIG. 10. The transmitter 720 may utilize a single antenna or a set of antennas.

Figure 8:
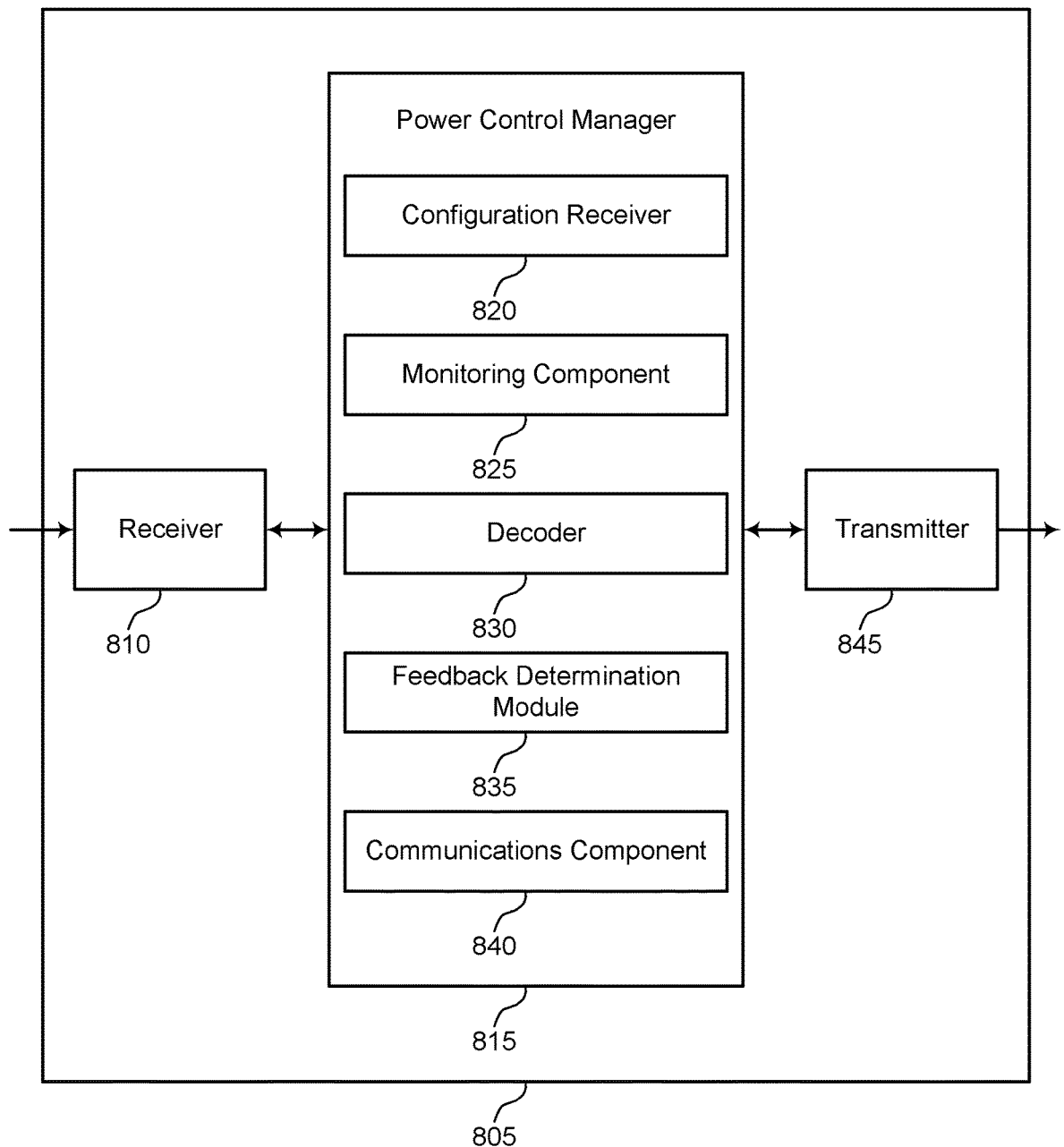

FIG. 8 shows a block diagram of a device 805 that supports power control for shared feedback in accordance with aspects of the present disclosure. The device 805 may be an example of aspects of a device 705, or a UE 115 as described herein. The device 805 may include a receiver 810, a power control manager 815, and a transmitter 845. The device 805 can be implemented, at least in part, by one or both of a modem and a processor. Each of these components may be in communication with one another (for example, via one or more buses).

The receiver 810 may receive information such as packets, user data, or control information associated with various information channels (for example, control channels, data channels, and information related to power control for shared feedback). Information may be passed on to other components of the device 805. The receiver 810 may be an example of aspects of the transceiver 1020 described with reference to FIG. 10. The receiver 810 may utilize a single antenna or a set of antennas.

The power control manager 815 may be an example of aspects of the power control manager 715 as described herein. The power control manager 815 may include a configuration receiver 820, a monitoring component 825, a decoder 830, a feedback determination component 835, and a communications component 840. The power control manager 815 may be an example of aspects of the power control manager 1010 described herein.

The configuration receiver 820 may receive, from a base station, a power control configuration indicating one or more power control parameters for an uplink feedback message associated with a multicast message.

The monitoring component 825 may monitor a set of downlink resources for the multicast message from the base station.

The decoder 830 may determine a decoding failure for the multicast message based on the monitoring.

The feedback determination component 835 may determine, based on the one or more power control parameters, whether to transmit the uplink feedback message indicating the decoding failure via a set of uplink resources allocated to a group of UEs including the UE.

The communications component 840 may communicate with the base station based on determining whether to transmit the uplink feedback message indicating the decoding failure.

The transmitter 845 may transmit signals generated by other components of the device 805. In some examples, the transmitter 845 may be collocated with a receiver 810 in a transceiver component. For example, the transmitter 845 may be an example of aspects of the transceiver 1020 described with reference to FIG. 10. The transmitter 845 may utilize a single antenna or a set of antennas.

In some examples, power control manager 815 may be implemented as an integrated circuit or chipset for a mobile device modem, and the receiver 810 and transmitter 845 may be implemented as analog components (for example, amplifiers, filters, antennas, etc.) coupled with the mobile device modem to enable wireless transmission and reception.

The power control manager 815 as described herein may be implemented to realize one or more potential advantages. Various implementations may enable improved likelihood that feedback transmissions are received from UEs transmitting to a base station using multicast communications. At least some implementations may enable the power control manager 815 to effectively adapt the transmit or receive power for feedback transmissions based on a pathloss value or other communications quality parameters. At least some implementations may enable power control manager 815 to determine various threshold parameters and weighting factors for adapting transmit or receive power.

Based on implementing the interference mitigation techniques as described herein, one or more processors of the device 805 (for example, processor(s) controlling or incorporated with one or more of receiver 810, power control manager 815, and transmitter 845) may improve communications reliability. For example, a base station may more accurately receive NACKs from UEs, and may more effectively retransmit multicast data to UEs that experience decoding failure.

Figure 9:
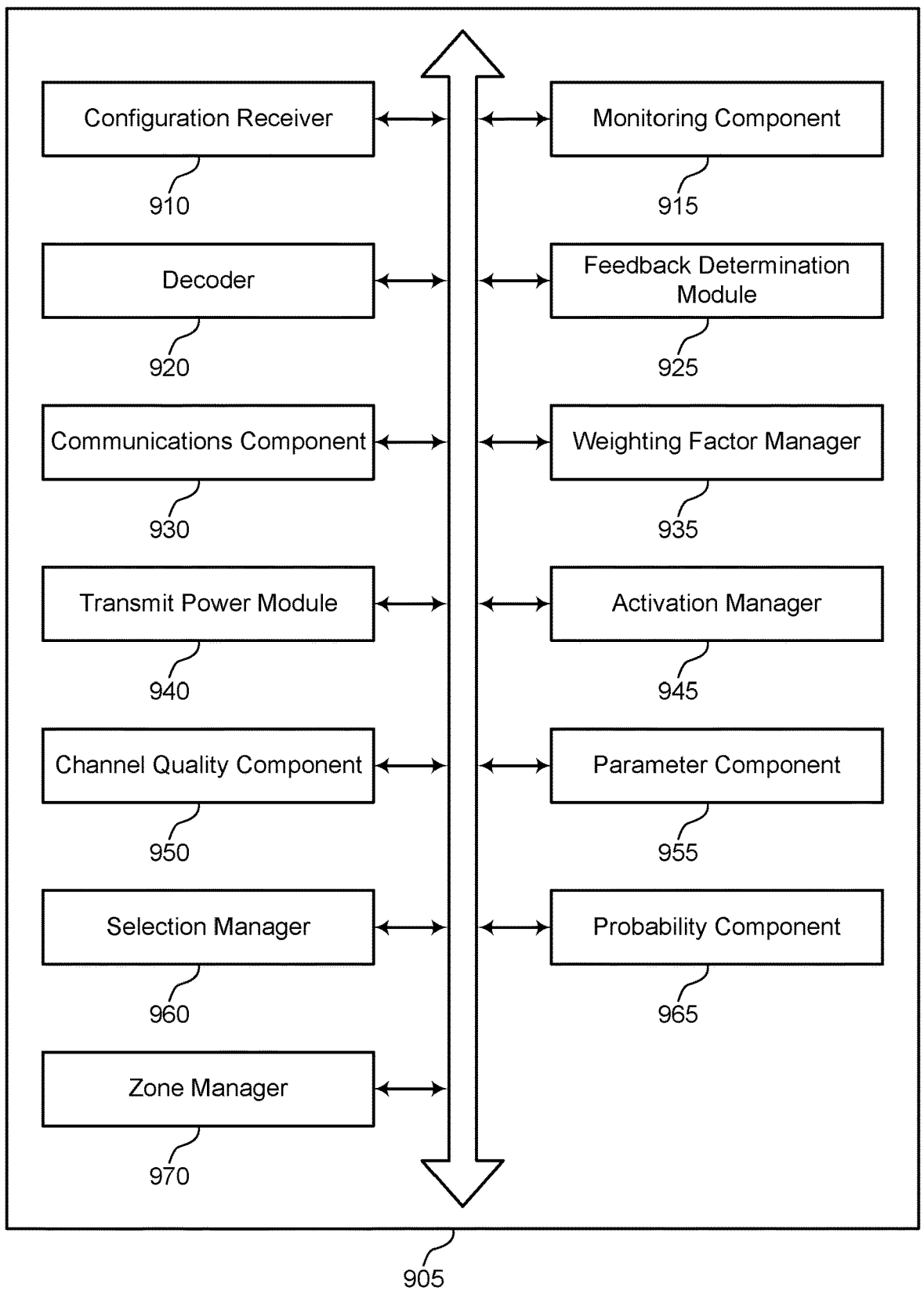
FIG. 9 shows a block diagram of a power control manager that supports power control for shared feedback in accordance with aspects of the present disclosure.

FIG. 9 shows a block diagram of a power control manager 905 that supports power control for shared feedback in accordance with aspects of the present disclosure. The power control manager 905 may be an example of aspects of a power control manager 715, a power control manager 815, or a power control manager 1010 described herein. The power control manager 905 may include a configuration receiver 910, a monitoring component 915, a decoder 920, a feedback determination component 925, a communications component 930, a weighting factor manager 935, a transmit power component 940, an activation manager 945, a channel quality component 950, a parameter component 955, a selection manager 960, a probability component 965, and a zone manager 970. Each of these components may communicate, directly or indirectly, with one another (for example, via one or more buses).

The configuration receiver 910 may receive, from a base station, a power control configuration indicating one or more power control parameters for an uplink feedback message associated with a multicast message. In some examples, the configuration receiver 910 may receive the power control configuration via RRC signaling, a MAC-CE, or DCI.

The monitoring component 915 may monitor a set of downlink resources for the multicast message from the base station.

The decoder 920 may determine a decoding failure for the multicast message based on the monitoring. In some examples, determining that a number of decoding failures at the UE satisfies the probability threshold, in which communicating with the base station includes transmitting the uplink feedback message based on the number of decoding failures satisfying the probability threshold.

The feedback determination component 925 may determine, based on the one or more power control parameters, whether to transmit the uplink feedback message indicating the decoding failure via a set of uplink resources allocated to a group of UEs including the UE.

The communications component 930 may communicate with the base station based on determining whether to transmit the uplink feedback message indicating the decoding failure.

In some examples, the one or more power control parameters may include a weighting factor for an uplink control channel. The weighting factor manager 935 may determine a weighting factor of the one or more power control parameters for an uplink control channel based on the power control configuration. In some examples, the weighting factor manager 935 may determine the weighting factor based on a channel quality parameter associated with the UE, in which the channel quality parameter includes one or more of a pathloss, a signal to interference plus noise ratio, a signal to noise ratio, a reference signal received power, a reference signal received quality, or a channel quality indicator. In some examples, the weighting factor manager 935 may receive an indication of the weighting factor of the one or more power control parameters from the base station. In some implementations, the weighting factor is different than an a value configured for an uplink shared channel transmission. In some implementations, the weighting factor is greater than 1.

The transmit power component 940 may determine a transmit power from a set of transmit powers for the uplink feedback message based on the weighting factor, in which communicating with the base station includes transmitting the uplink feedback message in the uplink control channel via the set of uplink resources based on the transmit power. In some examples, the one or more power control parameters may include a transmit power threshold, and the transmit power component 940 may determine the transmit power threshold for the UE. In some examples, the transmit power component 940 may determine a transmit power for the uplink feedback message. In some examples, the transmit power component 940 may receive an indication of the transmit power threshold of the one or more power control parameters from the base station, in which determining the transmit power threshold for the UE is based on receiving the indication of the transmit power threshold. In some examples, the transmit power component 940 may determine a transmit power from a set of transmit powers for the uplink feedback message using a first power control parameter of the one or more power control parameters based on the channel quality parameter exceeding the channel quality threshold, in which communicating with the base station is based on determining the transmit power for the uplink feedback message.

In some examples, the transmit power component 940 may determine the transmit power for the uplink feedback message using a second power control parameter of the one or more power control parameters different than the first power control parameter based on the channel quality parameter being within the range, in which communicating with the base station is based on determining the transmit power for the uplink feedback message. In some examples, the transmit power component 940 may determine a transmit power from a set of transmit powers for the uplink feedback message based on the open loop power control parameter and the weighting factor, in which communicating with the base station is based on determining the transmit power. In some implementations, the transmit power threshold corresponds to a maximum power of an uplink carrier configured for the UE or a maximum power capability of the UE. In some implementations, the first and second power control parameters each include one of a weighting factor or an open loop power control parameter.

The activation manager 945 may activate uplink power control based on the power control configuration, in which activation of the uplink power control corresponds to a first set of open loop power control parameters of the one or more power control parameters different than a second set of open loop power control parameters of the one or more power control parameters associated with deactivation of the uplink power control. In some examples, the activation manager 945 may activate uplink power control based on a comparison of the transmit power to the transmit power threshold, in which communicating with the base station is based on activating the uplink power control.

The channel quality component 950 may determine that a channel quality parameter of the UE exceeds a channel quality threshold. In some examples, the channel quality component 950 may determine that the channel quality parameter of the UE is within a range between the channel quality threshold and a second channel quality threshold. In some examples, the channel quality component 950 may receive an indication of the channel quality threshold from the base station, in which determining that the channel quality parameter exceeds the channel quality threshold is based on receiving the indication of the channel quality threshold. In some examples, a channel quality parameter of the UE satisfies a channel quality threshold, and the UE may refrain from transmitting the uplink feedback message based on the channel quality parameter of the UE crossing the channel quality threshold.

The parameter component 955 may determine a set of parameters of the one or more power control parameters for a transmit power of the uplink feedback message based on a receive power of the base station, in which communicating with the base station is based on determining the set of parameters.

The selection manager 960 may select an open loop power control parameter from a set of open loop power control parameters of the one or more power control parameters. In some examples, the selection manager 960 may select a weighting factor from a set of weighting factors of the one or more power control parameters.

The probability component 965 may determine a probability factor for the UE of the one or more power control parameters, in which determining whether to transmit the uplink feedback message is based on the probability factor. In some examples, the probability component 965 may receive, from the base station, an indication of the probability factor for the UE, in which determining the probability factor for the UE is based on receiving the indication of the probability factor. In some examples, the probability component 965 may determine the probability factor for the UE based on the channel quality parameter of the UE. In some examples, the probability component 965 may determine a probability threshold of the one or more power control parameters for the UE.

The zone manager 970 may determine that the UE corresponds to a zone of a set of multicast zones. In some examples, the zone manager 970 may determine the set of uplink resources based on the zone, in which communicating with the base station is based on determining the set of uplink resources. In some examples, the zone manager 970 may receive an indication of the zone or a zone identifier from the base station, in which determining that the UE corresponds to the zone is based on receiving the indication of the zone or the zone identifier. In some implementations, each of the set of multicast zones is associated with one or more of a respective location, a respective beam, a respective sector, a respective angle, a respective distance, a respective channel quality parameter, or a respective transmission configuration indicator state.

Figure 10:
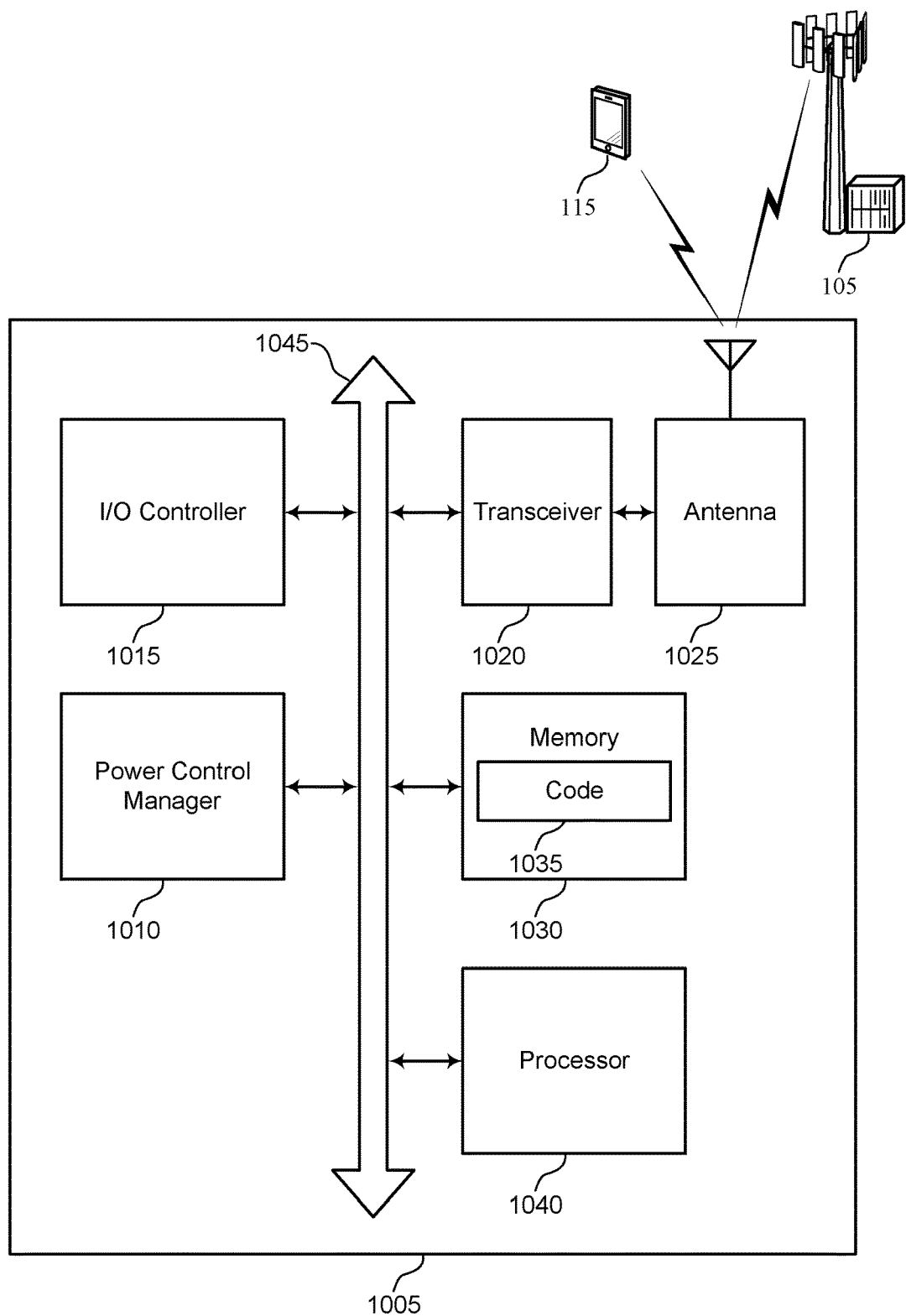
FIG. 10 shows a diagram of a system including a device that supports power control for shared feedback in accordance with aspects of the present disclosure.

FIG. 10 shows a diagram of a system including a device 1005 that supports power control for shared feedback in accordance with aspects of the present disclosure. The device 1005 may be an example of or include the components of device 705, device 805, or a UE 115 as described herein. The device 1005 may include components for bi-directional voice and data communications including components for transmitting and receiving communications, including a power control manager 1010, an I/O controller 1015, a transceiver 1020, an antenna 1025, memory 1030, and a processor 1040. These components may be in electronic communication via one or more buses (for example, bus 1045).

The power control manager 1010 may receive, from a base station, a power control configuration indicating one or more power control parameters for an uplink feedback message associated with a multicast message, monitor a set of downlink resources for the multicast message from the base station, determine a decoding failure for the multicast message based on the monitoring, determine, based on the one or more power control parameters, whether to transmit the uplink feedback message indicating the decoding failure via a set of uplink resources allocated to a group of UEs including the UE, and communicate with the base station based on determining whether to transmit the uplink feedback message indicating the decoding failure.

The I/O controller 1015 may manage input and output signals for the device 1005. The I/O controller 1015 may also manage peripherals not integrated into the device 1005. In some implementations, the I/O controller 1015 may represent a physical connection or port to an external peripheral. In some implementations, the I/O controller 1015 may utilize an operating system such as iOS®, ANDROID®, MS-DOS®, MS-WINDOWS®, OS/2®, UNIX®, LINUX®, or another known operating system. In other cases, the I/O controller 1015 may represent or interact with a modem, a keyboard, a mouse, a touchscreen, or a similar device. In some implementations, the I/O controller 1015 may be implemented as part of a processor. In some implementations, a user may interact with the device 1005 via the I/O controller 1015 or via hardware components controlled by the I/O controller 1015.

The transceiver 1020 may communicate bi-directionally, via one or more antennas, wired, or wireless links as described above. For example, the transceiver 1020 may represent a wireless transceiver and may communicate bi-directionally with another wireless transceiver. The transceiver 1020 may also include a modem to modulate the packets and provide the modulated packets to the antennas for transmission, and to demodulate packets received from the antennas.

In some implementations, the device 1005 may include a single antenna 1025 or more than one antenna 1025, which may be capable of concurrently transmitting or receiving multiple wireless transmissions.

The memory 1030 may include random access memory (RAM) and read only memory (ROM). The memory 1030 may store computer-readable, computer-executable code 1035 including instructions that, when executed, cause the processor to perform various functions described herein. In some implementations, the memory 1030 may contain, among other things, a basic I/O system (BIOS) which may control basic hardware or software operation such as the interaction with peripheral components or devices.

The processor 1040 may include an intelligent hardware device, (for example, a general-purpose processor, a DSP, a central processing unit (CPU), a microcontroller, an ASIC, an FPGA, a programmable logic device, a discrete gate or transistor logic component, a discrete hardware component, or any combination thereof). In some implementations, the processor 1040 may be configured to operate a memory array using a memory controller. In other cases, a memory controller may be integrated into the processor 1040. The processor 1040 may be configured to execute computer-readable instructions stored in a memory (for example, the memory 1030) to cause the device 1005 to perform various functions (for example, functions or tasks supporting power control for shared feedback).

The code 1035 may include instructions to implement aspects of the present disclosure, including instructions to support wireless communications. The code 1035 may be stored in a non-transitory computer-readable medium such as system memory or other type of memory. In some implementations, the code 1035 may not be directly executable by the processor 1040 but may cause a computer (for example, when compiled and executed) to perform functions described herein.

Figure 11:
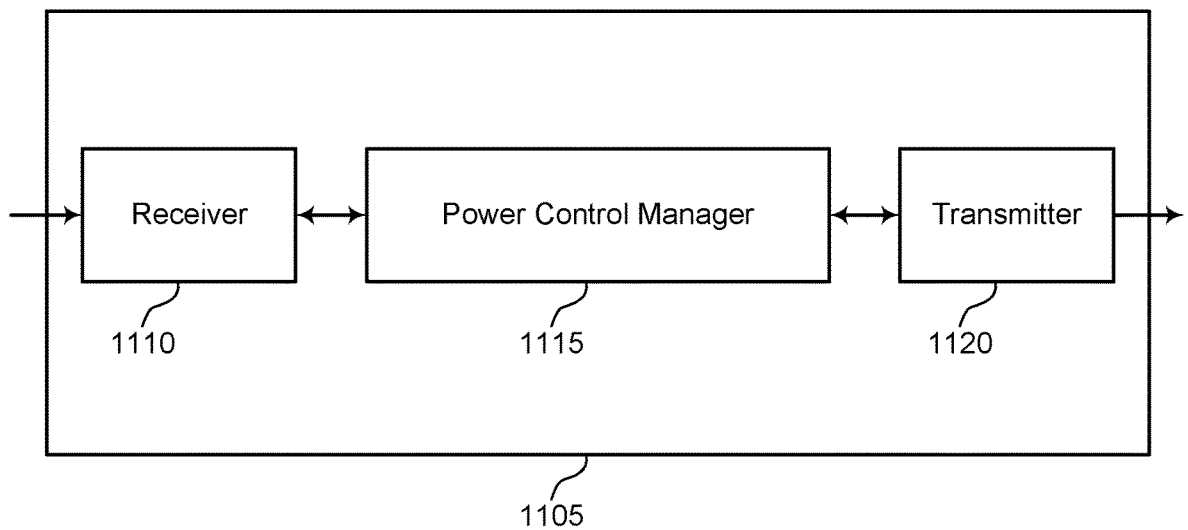
FIGS. 11 and 12 show block diagrams of devices that support power control for shared feedback in accordance with aspects of the present disclosure.

FIG. 11 shows a block diagram of a device 1105 that supports power control for shared feedback in accordance with aspects of the present disclosure. The device 1105 may be an example of aspects of a base station 105 as described herein. The device 1105 may include a receiver 1110, a power control manager 1115, and a transmitter 1120. The device 1105 can be implemented, at least in part, by one or both of a modem and a processor. Each of these components may be in communication with one another (for example, via one or more buses).

The receiver 1110 may receive information such as packets, user data, or control information associated with various information channels (for example, control channels, data channels, and information related to power control for shared feedback, etc.). Information may be passed on to other components of the device 1105. The receiver 1110 may be an example of aspects of the transceiver 1420 described with reference to FIG. 14. The receiver 1110 may utilize a single antenna or a set of antennas.

The power control manager 1115 may transmit an indication of a power control configuration indicating one or more power control parameters for an uplink feedback message associated with a multicast message for a group of UEs, transmit the multicast message to the group of UEs, and monitor a set of uplink resources allocated to one or more of the group of UEs for the uplink feedback message from a UE of the group of UEs. The power control manager 1115 may be an example of aspects of the power control manager 1410 described herein.

The power control manager 1115, or its sub-components, may be implemented in hardware, code (for example, software or firmware) executed by a processor, or any combination thereof. If implemented in code executed by a processor, the functions of the power control manager 1115, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The transmitter 1120 may transmit signals generated by other components of the device 1105. In some examples, the transmitter 1120 may be collocated with a receiver 1110 in a transceiver component. For example, the transmitter 1120 may be an example of aspects of the transceiver 1420 described with reference to FIG. 14. The transmitter 1120 may utilize a single antenna or a set of antennas.

Figure 12:
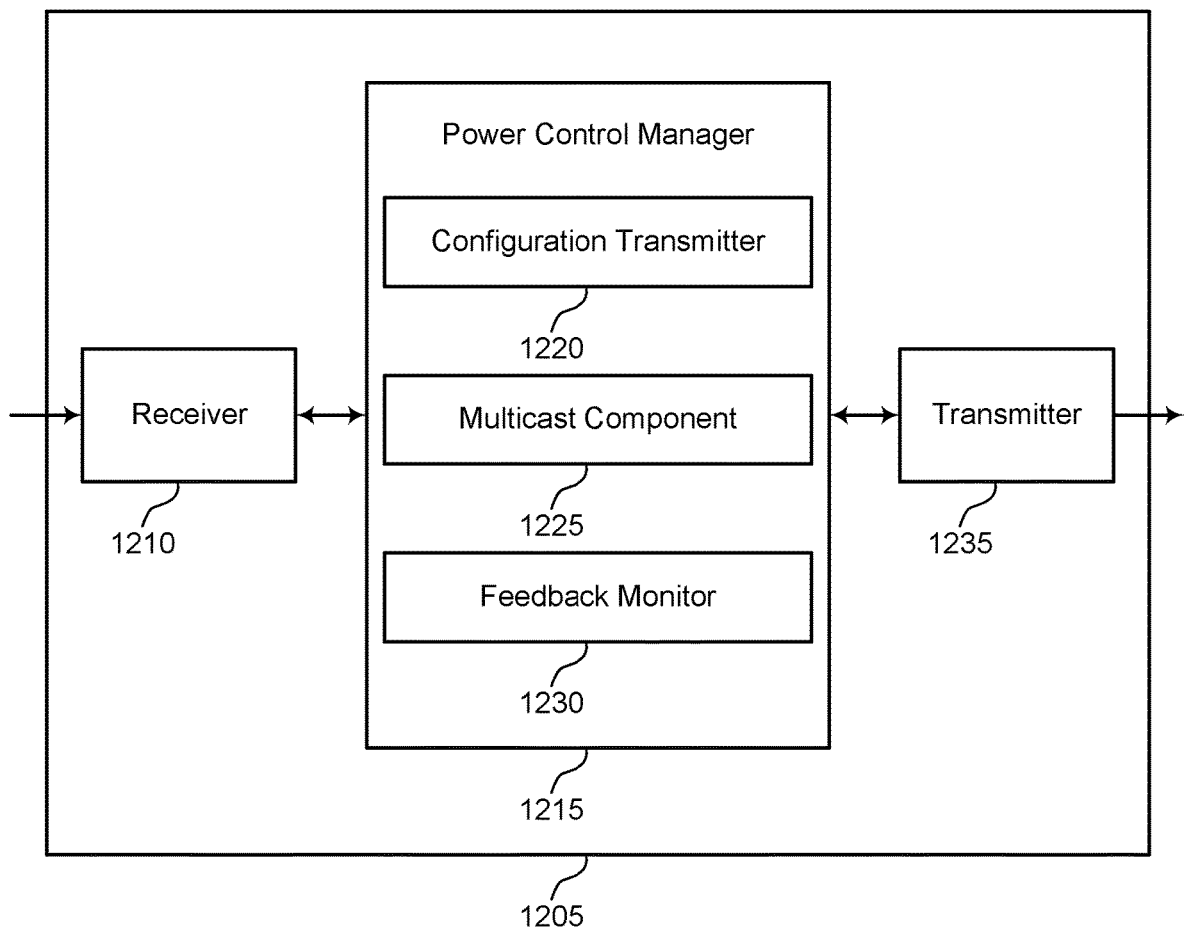

FIG. 12 shows a block diagram of a device 1205 that supports power control for shared feedback in accordance with aspects of the present disclosure. The device 1205 may be an example of aspects of a device 1105, or a base station 105 as described herein. The device 1205 may include a receiver 1210, a power control manager 1215, and a transmitter 1235. The device 1205 can be implemented, at least in part, by one or both of a modem and a processor. Each of these components may be in communication with one another (for example, via one or more buses).

The receiver 1210 may receive information such as packets, user data, or control information associated with various information channels (for example, control channels, data channels, and information related to power control for shared feedback, etc.). Information may be passed on to other components of the device 1205. The receiver 1210 may be an example of aspects of the transceiver 1420 described with reference to FIG. 14. The receiver 1210 may utilize a single antenna or a set of antennas.

The power control manager 1215 may be an example of aspects of the power control manager 1115 as described herein. The power control manager 1215 may include a configuration transmitter 1220, a multicast component 1225, and a feedback monitor 1230. The power control manager 1215 may be an example of aspects of the power control manager 1410 described herein.

The configuration transmitter 1220 may transmit an indication of a power control configuration indicating one or more power control parameters for an uplink feedback message associated with a multicast message for a group of UEs.

The multicast component 1225 may transmit the multicast message to the group of UEs. The feedback monitor 1230 may monitor a set of uplink resources allocated to one or more of the group of UEs for the uplink feedback message from a UE of the group of UEs.

The transmitter 1235 may transmit signals generated by other components of the device 1205. In some examples, the transmitter 1235 may be collocated with a receiver 1210 in a transceiver component. For example, the transmitter 1235 may be an example of aspects of the transceiver 1420 described with reference to FIG. 14. The transmitter 1235 may utilize a single antenna or a set of antennas.

Figure 13:
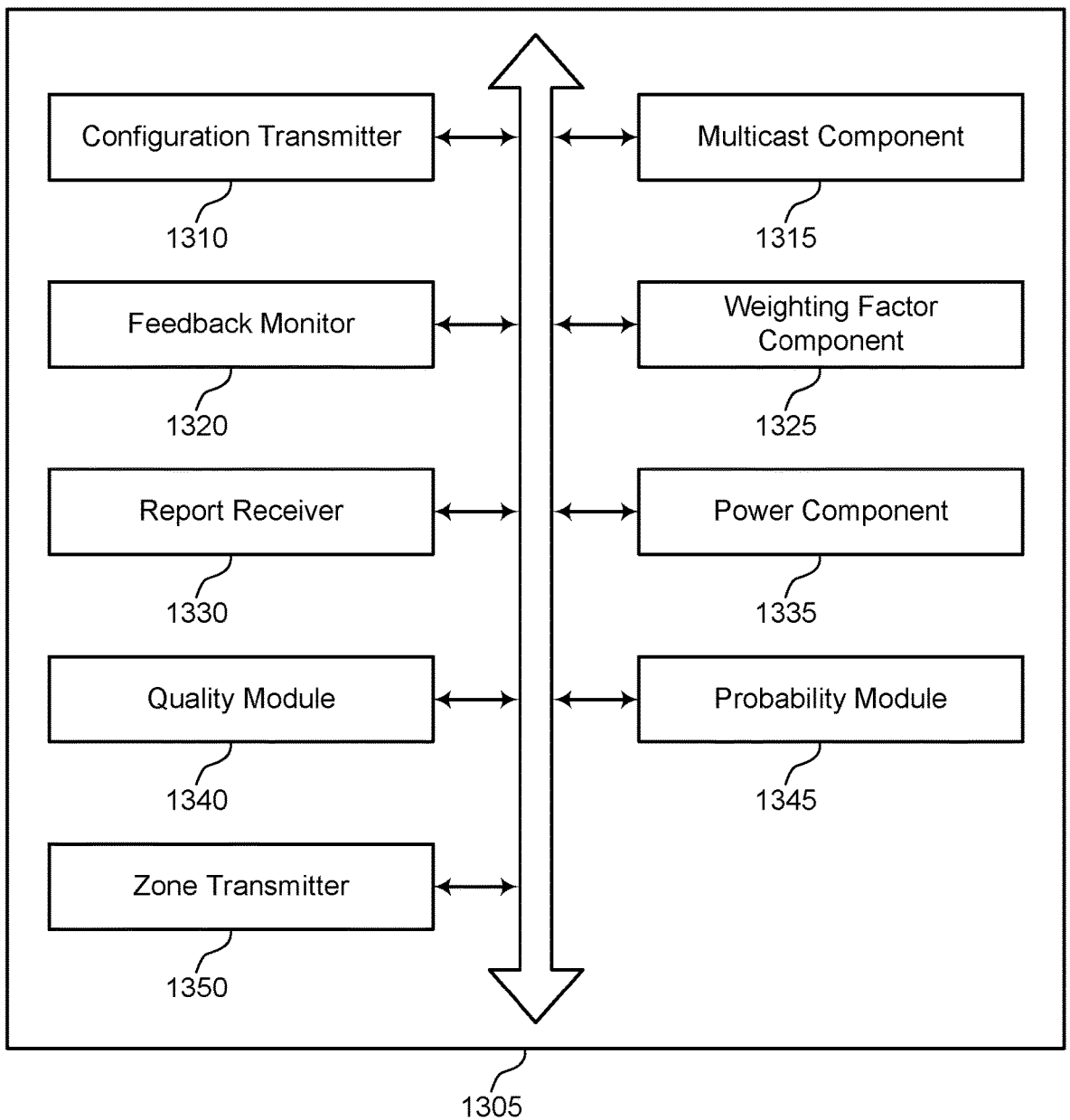
FIG. 13 shows a block diagram of a power control manager that supports power control for shared feedback in accordance with aspects of the present disclosure.

FIG. 13 shows a block diagram of a power control manager 1305 that supports power control for shared feedback in accordance with aspects of the present disclosure. The power control manager 1305 may be an example of aspects of a power control manager 1115, a power control manager 1215, or a power control manager 1410 described herein. The power control manager 1305 may include a configuration transmitter 1310, a multicast component 1315, a feedback monitor 1320, a weighting factor component 1325, a report receiver 1330, a power component 1335, a quality component 1340, a probability component 1345, and a zone transmitter 1350. Each of these components may communicate, directly or indirectly, with one another (for example, via one or more buses).

The configuration transmitter 1310 may transmit an indication of a power control configuration indicating one or more power control parameters for an uplink feedback message associated with a multicast message for a group of UEs. In some examples, the configuration transmitter 1310 may transmit the indication of the power control configuration via RRC signaling, a MAC-CE, or DCI.

The multicast component 1315 may transmit the multicast message to the group of UEs. The feedback monitor 1320 may monitor a set of uplink resources allocated to one or more of the group of UEs for the uplink feedback message from a UE of the group of UEs.

In some examples, the one or more power control parameters may be a weighting factor for an uplink control channel. The weighting factor component 1325 may determine the weighting factor of the one or more power control parameters for a transmit power, in which transmitting the indication of the power control configuration includes transmitting an indication of the weighting factor for the transmit power. In some examples, the weighting factor component 1325 may determine the weighting factor for the transmit power for the at least one UE based on the channel quality indication.

The report receiver 1330 may receive, from at least one UE of the group of UEs, a report including a channel quality indication for the at least one UE.

The power component 1335 may determine a transmit power threshold of the one or more power control parameters associated with activation of uplink power control, in which transmitting the indication of the power control configuration includes transmitting an indication of the transmit power threshold of the one or more power control parameters. In some implementations, the transmit power threshold corresponds to a maximum power of an uplink carrier configured for the UE or a maximum power capability of the UE.

The quality component 1340 may determine one or more channel quality thresholds of the one or more power control parameters, in which the one or more channel quality thresholds correspond to different weight factors, in which transmitting the indication of the power control configuration includes transmitting the one or more channel quality thresholds. In some examples, the one or more power control parameters may include one or more channel quality thresholds, in which the one or more channel quality thresholds correspond to different open loop power control parameters, in which transmitting the indication of the power control configuration includes transmitting the one or more channel quality thresholds of the one or more power control parameters.

The probability component 1345 may transmit a probability factor or a probability threshold of the one or more power control parameters to at least one UE of the group of UEs, in which transmitting the indication of the power control configuration includes transmitting an indication of the probability factor or the probability threshold.

The zone transmitter 1350 may transmit an indication of a zone of a set of multicast zones to at least one UE of the group of UEs, in which each of the set of multicast zones is associated with one or more of a respective location, a respective beam, a respective sector, a respective angle, a respective distance, a respective channel quality parameter, or a respective transmission configuration indicator state, in which transmitting the indication of the power control configuration includes transmitting the indication of the zone.

Figure 14:
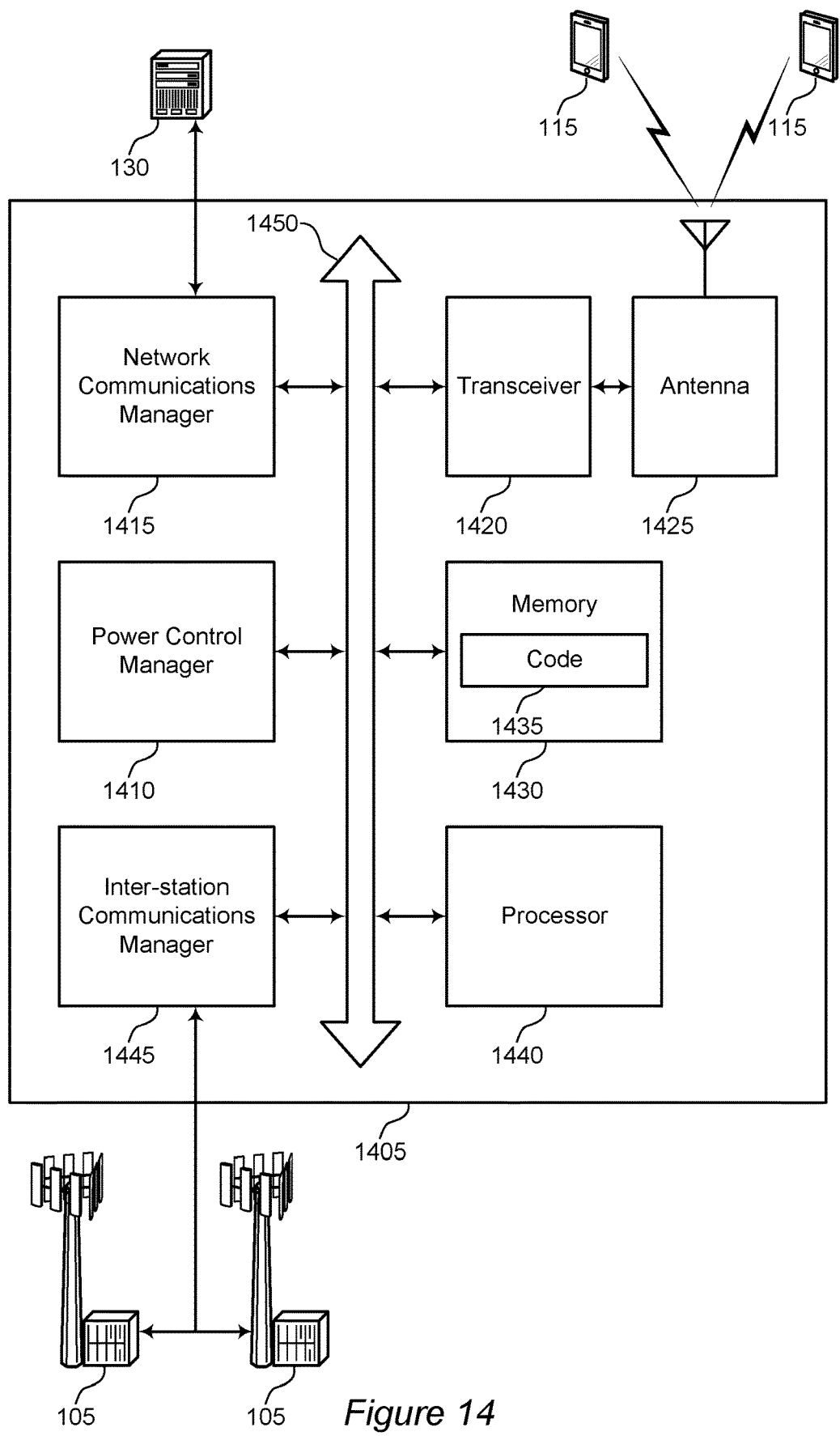
FIG. 14 shows a diagram of a system including a device that supports power control for shared feedback in accordance with aspects of the present disclosure.

FIG. 14 shows a diagram of a system including a device 1405 that supports power control for shared feedback in accordance with aspects of the present disclosure. The device 1405 may be an example of or include the components of device 1105, device 1205, or a base station 105 as described herein. The device 1405 may include components for bi-directional voice and data communications including components for transmitting and receiving communications, including a power control manager 1410, a network communications manager 1415, a transceiver 1420, an antenna 1425, memory 1430, a processor 1440, and an inter-station communications manager 1445. These components may be in electronic communication via one or more buses (for example, bus 1450).

The power control manager 1410 may transmit an indication of a power control configuration indicating one or more power control parameters for an uplink feedback message associated with a multicast message for a group of UEs, transmit the multicast message to the group of UEs, and monitor a set of uplink resources allocated to one or more of the group of UEs for the uplink feedback message from a UE of the group of UEs.

The network communications manager 1415 may manage communications with the core network (for example, via one or more wired backhaul links). For example, the network communications manager 1415 may manage the transfer of data communications for client devices, such as one or more UEs 115.

The transceiver 1420 may communicate bi-directionally, via one or more antennas, wired, or wireless links as described above. For example, the transceiver 1420 may represent a wireless transceiver and may communicate bi-directionally with another wireless transceiver. The transceiver 1420 may also include a modem to modulate the packets and provide the modulated packets to the antennas for transmission, and to demodulate packets received from the antennas.

In some implementations, the device 1405 may include a single antenna 1425 or more than one antenna 1425, which may be capable of concurrently transmitting or receiving multiple wireless transmissions.

The memory 1430 may include RAM, ROM, or a combination thereof. The memory 1430 may store computer-readable code 1435 including instructions that, when executed by a processor (for example, the processor 1440) cause the device to perform various functions described herein. In some implementations, the memory 1430 may contain, among other things, a BIOS which may control basic hardware or software operation such as the interaction with peripheral components or devices.

The processor 1440 may include an intelligent hardware device, (for example, a general-purpose processor, a DSP, a CPU, a microcontroller, an ASIC, an FPGA, a programmable logic device, a discrete gate or transistor logic component, a discrete hardware component, or any combination thereof). In some implementations, the processor 1440 may be configured to operate a memory array using a memory controller. In some implementations, a memory controller may be integrated into processor 1440. The processor 1440 may be configured to execute computer-readable instructions stored in a memory (for example, the memory 1430) to cause the device 1405 to perform various functions (for example, functions or tasks supporting power control for shared feedback).

The inter-station communications manager 1445 may manage communications with other base station 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communication network technology to provide communication between base stations 105.

The code 1435 may include instructions to implement aspects of the present disclosure, including instructions to support wireless communications. The code 1435 may be stored in a non-transitory computer-readable medium such as system memory or other type of memory. In some implementations, the code 1435 may not be directly executable by the processor 1440 but may cause a computer (for example, when compiled and executed) to perform functions described herein.

Figure 15:
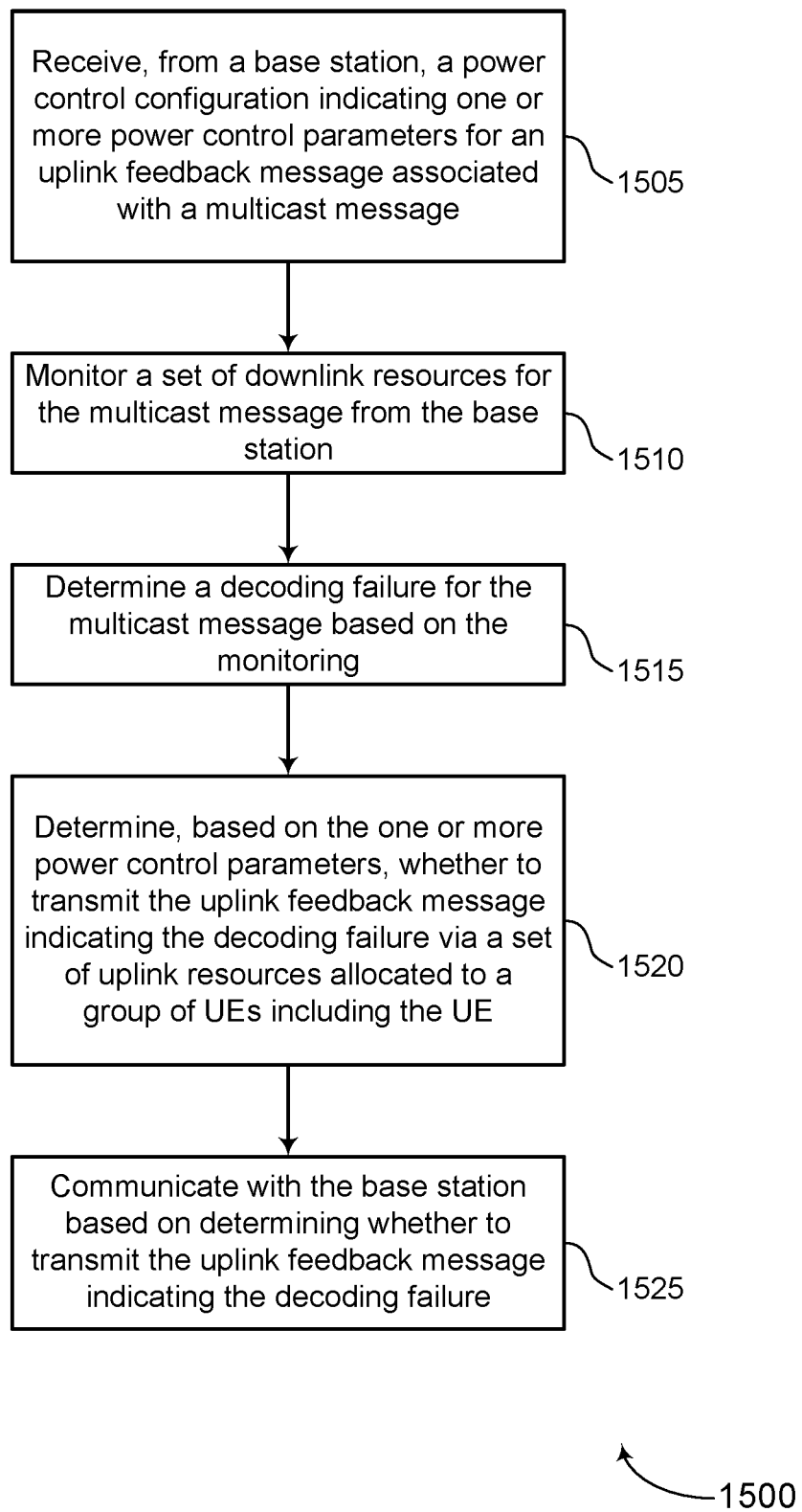
FIGS. 15-21 show flowcharts illustrating methods that support power control for shared feedback in accordance with aspects of the present disclosure.

FIG. 15 shows a flowchart illustrating a method 1500 that supports power control for shared feedback in accordance with aspects of the present disclosure. The operations of method 1500 may be implemented by a UE 115 or its components as described herein. For example, the operations of method 1500 may be performed by a power control manager as described with reference to FIGS. 7-10. In some examples, a UE may execute a set of instructions to control the functional elements of the UE to perform the functions described below. Additionally or alternatively, a UE may perform aspects of the functions described below using special-purpose hardware.

At 1505, the UE may receive, from a base station, a power control configuration indicating one or more power control parameters for an uplink feedback message associated with a multicast message. The operations of 1505 may be performed according to the methods described herein. In some examples, aspects of the operations of 1505 may be performed by a configuration receiver as described with reference to FIGS. 7-10.

At 1510, the UE may monitor a set of downlink resources for the multicast message from the base station. The operations of 1510 may be performed according to the methods described herein. In some examples, aspects of the operations of 1510 may be performed by a monitoring component as described with reference to FIGS. 7-10.

At 1515, the UE may determine a decoding failure for the multicast message based on the monitoring. The operations of 1515 may be performed according to the methods described herein. In some examples, aspects of the operations of 1515 may be performed by a decoder as described with reference to FIGS. 7-10.

At 1520, the UE may determine, based on the one or more power control parameters, whether to transmit the uplink feedback message indicating the decoding failure via a set of uplink resources allocated to a group of UEs including the UE. The operations of 1520 may be performed according to the methods described herein. In some examples, aspects of the operations of 1520 may be performed by a feedback determination component as described with reference to FIGS. 7-10.

At 1525, the UE may communicate with the base station based on determining whether to transmit the uplink feedback message indicating the decoding failure. The operations of 1525 may be performed according to the methods described herein. In some examples, aspects of the operations of 1525 may be performed by a communications component as described with reference to FIGS. 7-10.

Figure 16:
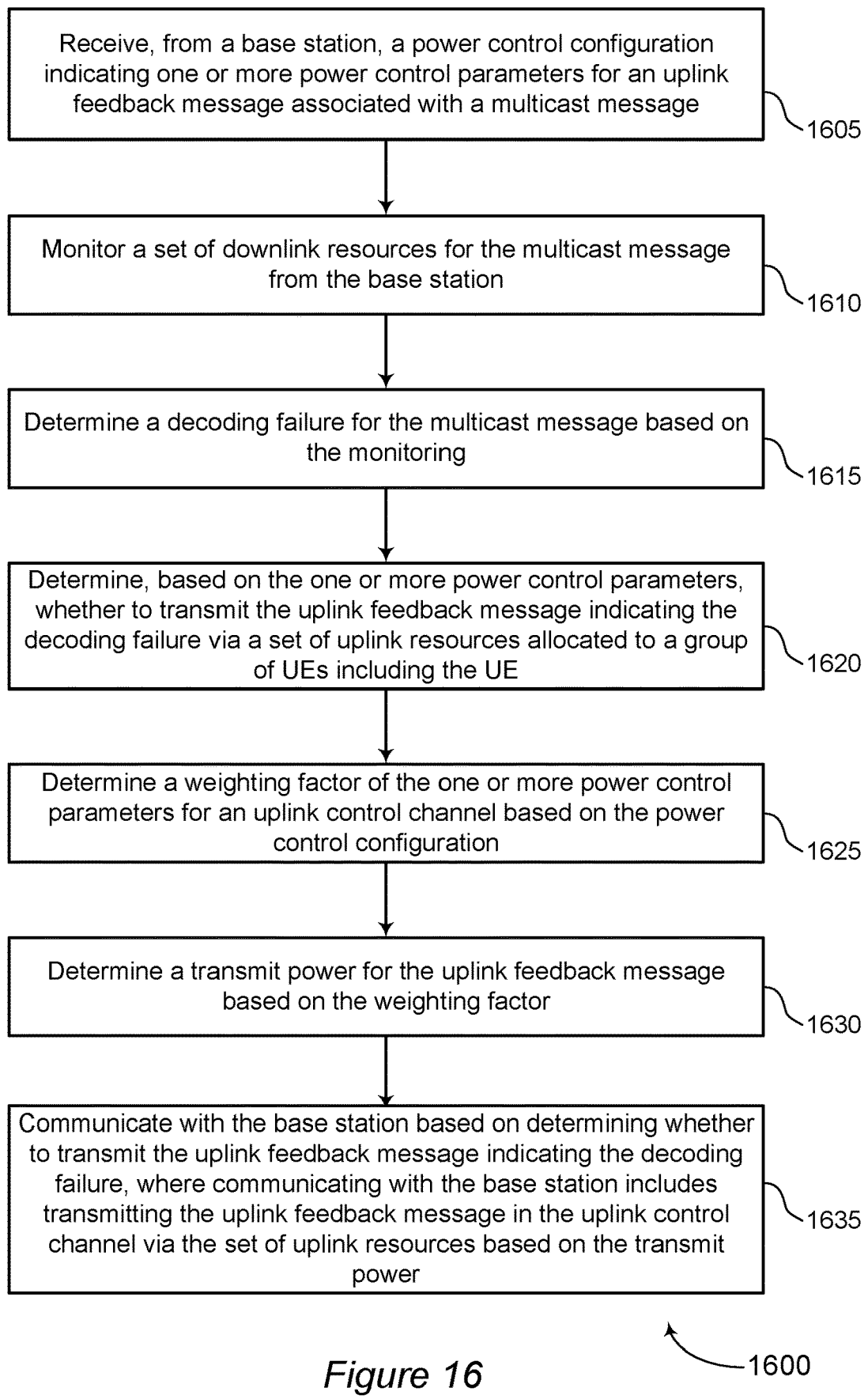

FIG. 16 shows a flowchart illustrating a method 1600 that supports power control for shared feedback in accordance with aspects of the present disclosure. The operations of method 1600 may be implemented by a UE 115 or its components as described herein. For example, the operations of method 1600 may be performed by a power control manager as described with reference to FIGS. 7-10. In some examples, a UE may execute a set of instructions to control the functional elements of the UE to perform the functions described below. Additionally or alternatively, a UE may perform aspects of the functions described below using special-purpose hardware.

At 1605, the UE may receive, from a base station, a power control configuration indicating one or more power control parameters for an uplink feedback message associated with a multicast message. The operations of 1605 may be performed according to the methods described herein. In some examples, aspects of the operations of 1605 may be performed by a configuration receiver as described with reference to FIGS. 7-10.

At 1610, the UE may monitor a set of downlink resources for the multicast message from the base station. The operations of 1610 may be performed according to the methods described herein. In some examples, aspects of the operations of 1610 may be performed by a monitoring component as described with reference to FIGS. 7-10.

At 1615, the UE may determine a decoding failure for the multicast message based on the monitoring. The operations of 1615 may be performed according to the methods described herein. In some examples, aspects of the operations of 1615 may be performed by a decoder as described with reference to FIGS. 7-10.

At 1620, the UE may determine, based on the one or more power control parameters, whether to transmit the uplink feedback message indicating the decoding failure via a set of uplink resources allocated to a group of UEs including the UE. The operations of 1620 may be performed according to the methods described herein. In some examples, aspects of the operations of 1620 may be performed by a feedback determination component as described with reference to FIGS. 7-10.

In some examples, the one or more power control parameters may be a weighting factor for an uplink control channel. At 1625, the UE may determine the weighting factor for the uplink control channel based on the power control configuration. The operations of 1625 may be performed according to the methods described herein. In some examples, aspects of the operations of 1625 may be performed by a weighting factor manager as described with reference to FIGS. 7-10.

At 1630, the UE may determine a transmit power from a set of transmit powers for the uplink feedback message based on the weighting factor. The operations of 1630 may be performed according to the methods described herein. In some examples, aspects of the operations of 1630 may be performed by a transmit power component as described with reference to FIGS. 7-10.

At 1635, UE may communicate with the base station based on determining whether to transmit the uplink feedback message indicating the decoding failure, in which communicating with the base station includes transmitting the uplink feedback message in the uplink control channel via the set of uplink resources based on the transmit power. The operations of 1635 may be performed according to the methods described herein. In some examples, aspects of the operations of 1635 may be performed by a communications component as described with reference to FIGS. 7-10.

Figure 17:
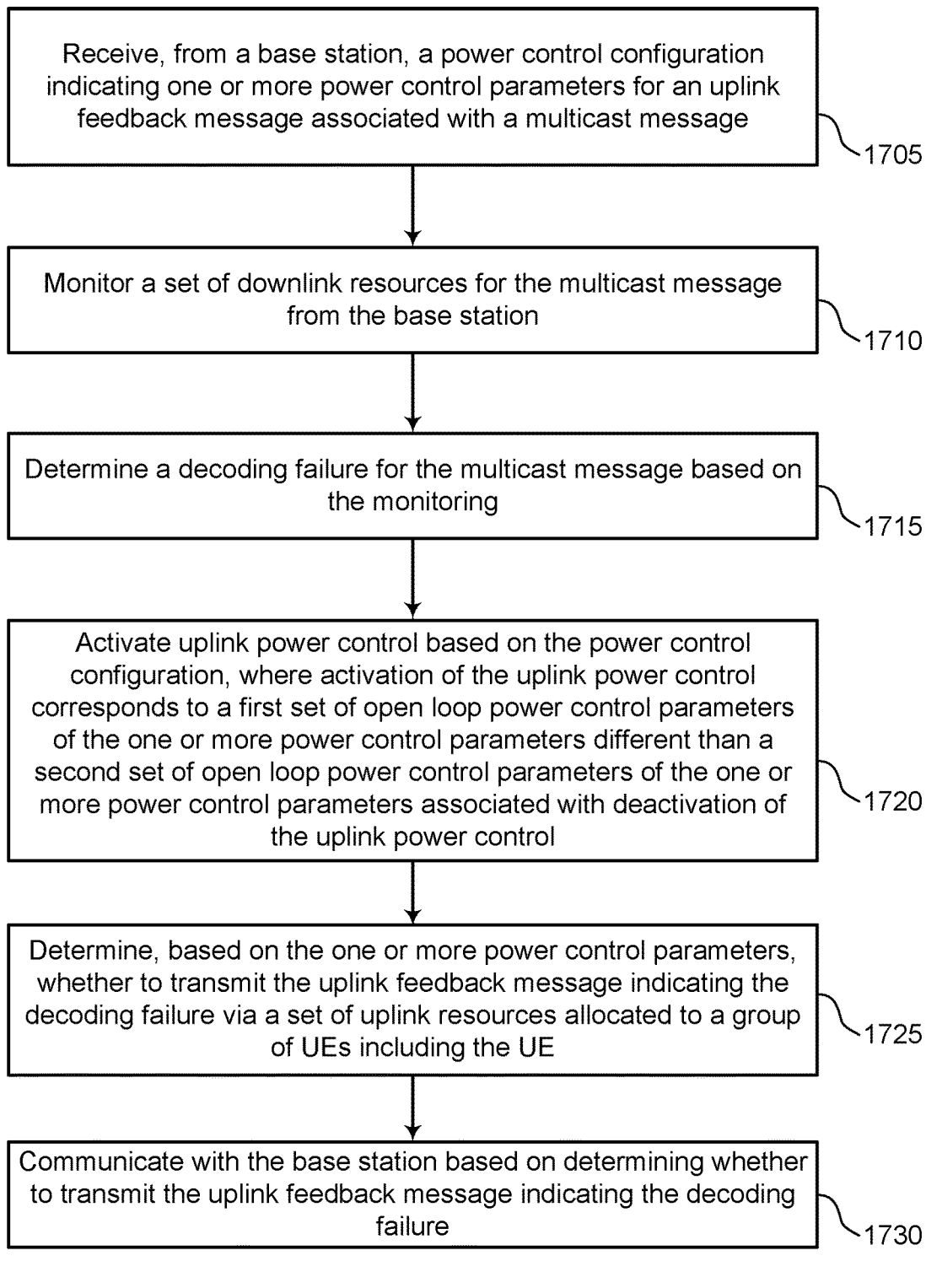

FIG. 17 shows a flowchart illustrating a method 1700 that supports power control for shared feedback in accordance with aspects of the present disclosure. The operations of method 1700 may be implemented by a UE 115 or its components as described herein. For example, the operations of method 1700 may be performed by a power control manager as described with reference to FIGS. 7-10. In some examples, a UE may execute a set of instructions to control the functional elements of the UE to perform the functions described below. Additionally or alternatively, a UE may perform aspects of the functions described below using special-purpose hardware.

At 1705, the UE may receive, from a base station, a power control configuration indicating one or more power control parameters for an uplink feedback message associated with a multicast message. The operations of 1705 may be performed according to the methods described herein. In some examples, aspects of the operations of 1705 may be performed by a configuration receiver as described with reference to FIGS. 7-10.

At 1710, the UE may monitor a set of downlink resources for the multicast message from the base station. The operations of 1710 may be performed according to the methods described herein. In some examples, aspects of the operations of 1710 may be performed by a monitoring component as described with reference to FIGS. 7-10.

At 1715, the UE may determine a decoding failure for the multicast message based on the monitoring. The operations of 1715 may be performed according to the methods described herein. In some examples, aspects of the operations of 1715 may be performed by a decoder as described with reference to FIGS. 7-10.

At 1720, the UE may activate uplink power control based on the power control configuration, in which activation of the uplink power control corresponds to a first set of open loop power control parameters of the one or more power control parameters different than a second set of open loop power control parameters of the one or more power control parameters associated with deactivation of the uplink power control. The operations of 1720 may be performed according to the methods described herein. In some examples, aspects of the operations of 1720 may be performed by an activation manager as described with reference to FIGS. 7-10.

At 1725, the UE may determine, based on the one or more power control parameters, whether to transmit the uplink feedback message indicating the decoding failure via a set of uplink resources allocated to a group of UEs including the UE. The operations of 1725 may be performed according to the methods described herein. In some examples, aspects of the operations of 1725 may be performed by a feedback determination component as described with reference to FIGS. 7-10.

At 1730, the UE may communicate with the base station based on determining whether to transmit the uplink feedback message indicating the decoding failure. The operations of 1730 may be performed according to the methods described herein. In some examples, aspects of the operations of 1730 may be performed by a communications component as described with reference to FIGS. 7-10.

Figure 18:
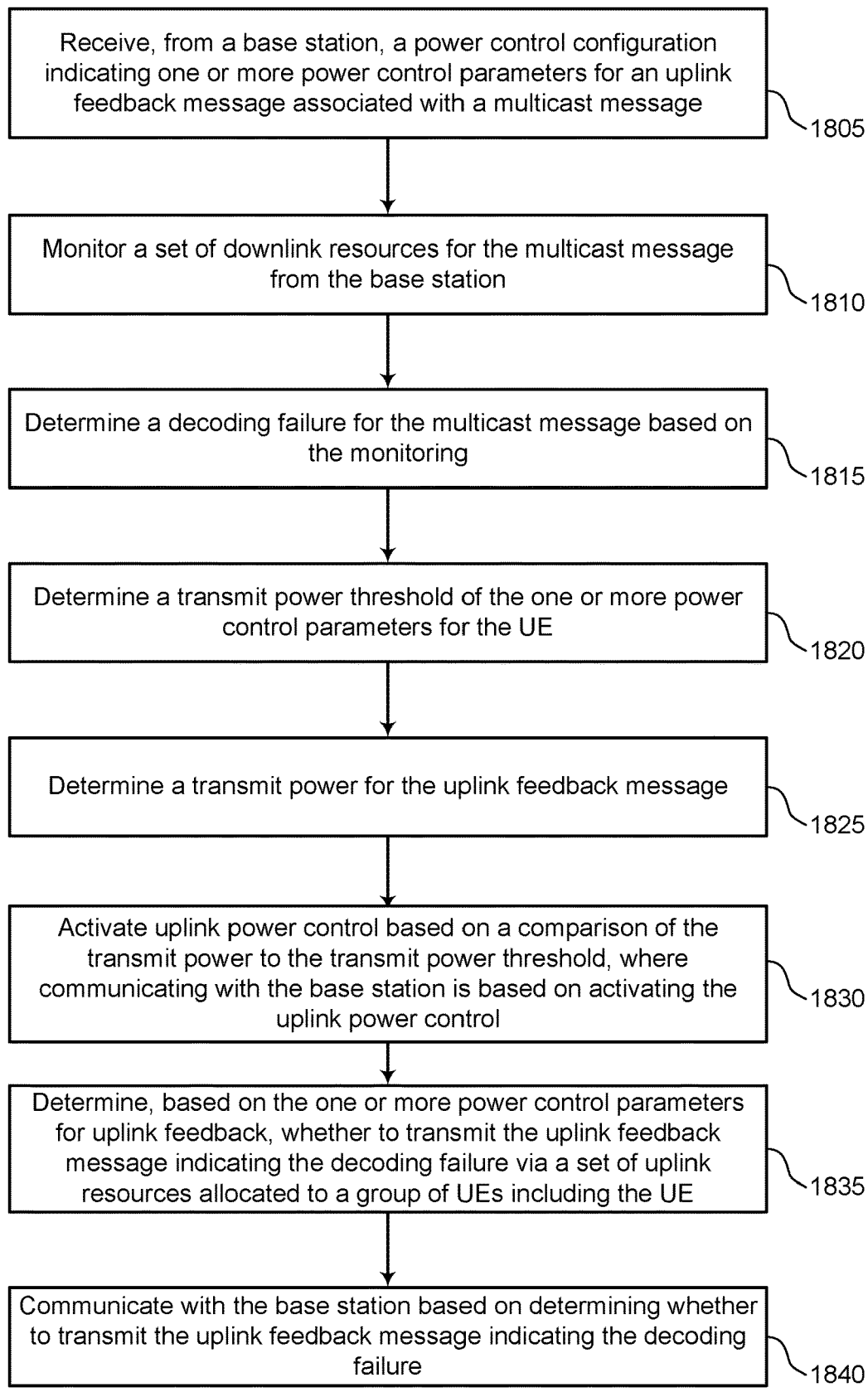

FIG. 18 shows a flowchart illustrating a method 1800 that supports power control for shared feedback in accordance with aspects of the present disclosure. The operations of method 1800 may be implemented by a UE 115 or its components as described herein. For example, the operations of method 1800 may be performed by a power control manager as described with reference to FIGS. 7-10. In some examples, a UE may execute a set of instructions to control the functional elements of the UE to perform the functions described below. Additionally or alternatively, a UE may perform aspects of the functions described below using special-purpose hardware.

At 1805, the UE may receive, from a base station, a power control configuration indicating one or more power control parameters for an uplink feedback message associated with a multicast message. The operations of 1805 may be performed according to the methods described herein. In some examples, aspects of the operations of 1805 may be performed by a configuration receiver as described with reference to FIGS. 7-10.

At 1810, the UE may monitor a set of downlink resources for the multicast message from the base station. The operations of 1810 may be performed according to the methods described herein. In some examples, aspects of the operations of 1810 may be performed by a monitoring component as described with reference to FIGS. 7-10.

At 1815, the UE may determine a decoding failure for the multicast message based on the monitoring. The operations of 1815 may be performed according to the methods described herein. In some examples, aspects of the operations of 1815 may be performed by a decoder as described with reference to FIGS. 7-10.

At 1820, the UE may determine a transmit power threshold of the one or more power control parameters for the UE. The operations of 1820 may be performed according to the methods described herein. In some examples, aspects of the operations of 1820 may be performed by a transmit power component as described with reference to FIGS. 7-10.

At 1825, the UE may determine a transmit power for the uplink feedback message. The operations of 1825 may be performed according to the methods described herein. In some examples, aspects of the operations of 1825 may be performed by a transmit power component as described with reference to FIGS. 7-10.

At 1830, the UE may activate uplink power control based on a comparison of the transmit power to the transmit power threshold, in which communicating with the base station is based on activating the uplink power control. The operations of 1830 may be performed according to the methods described herein. In some examples, aspects of the operations of 1830 may be performed by an activation manager as described with reference to FIGS. 7-10.

At 1835, the UE may determine, based on the one or more power control parameters, whether to transmit the uplink feedback message indicating the decoding failure via a set of uplink resources allocated to a group of UEs including the UE. The operations of 1835 may be performed according to the methods described herein. In some examples, aspects of the operations of 1835 may be performed by a feedback determination component as described with reference to FIGS. 7-10.

At 1840, the UE may communicate with the base station based on determining whether to transmit the uplink feedback message indicating the decoding failure. The operations of 1840 may be performed according to the methods described herein. In some examples, aspects of the operations of 1840 may be performed by a communications component as described with reference to FIGS. 7-10.

Figure 19:
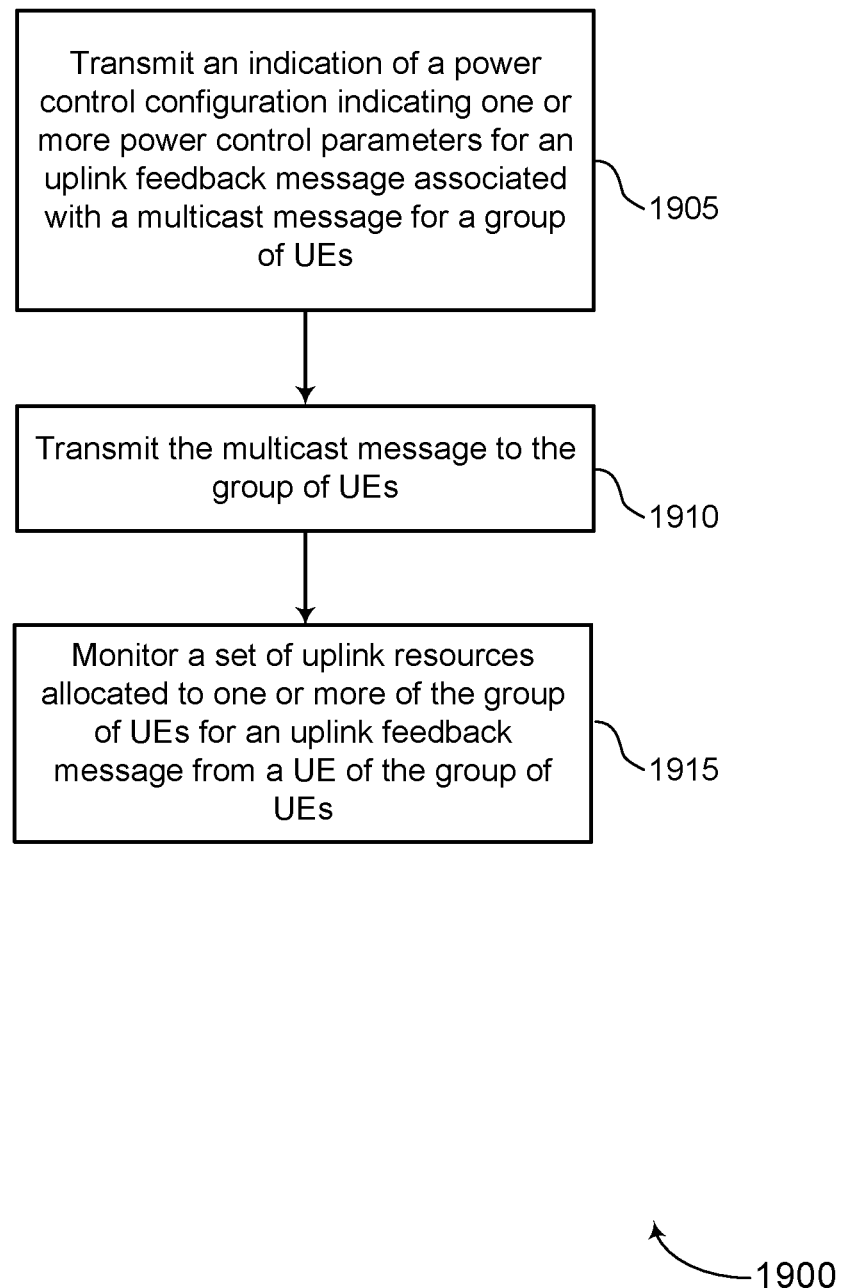

FIG. 19 shows a flowchart illustrating a method 1900 that supports power control for shared feedback in accordance with aspects of the present disclosure. The operations of method 1900 may be implemented by a base station 105 or its components as described herein. For example, the operations of method 1900 may be performed by a power control manager as described with reference to FIGS. 11-14. In some examples, a base station may execute a set of instructions to control the functional elements of the base station to perform the functions described below. Additionally or alternatively, a base station may perform aspects of the functions described below using special-purpose hardware.

At 1905, the base station may transmit an indication of a power control configuration indicating one or more power control parameters for an uplink feedback message associated with a multicast message for a group of UEs. The operations of 1905 may be performed according to the methods described herein. In some examples, aspects of the operations of 1905 may be performed by a configuration transmitter as described with reference to FIGS. 11-14.

At 1910, the base station may transmit the multicast message to the group of UEs. The operations of 1910 may be performed according to the methods described herein. In some examples, aspects of the operations of 1910 may be performed by a multicast component as described with reference to FIGS. 11-14.

At 1915, the base station may monitor a set of uplink resources allocated to one or more of the group of UEs for the uplink feedback message from a UE of the group of UEs. The operations of 1915 may be performed according to the methods described herein. In some examples, aspects of the operations of 1915 may be performed by a feedback monitor as described with reference to FIGS. 11-14.

Figure 20:
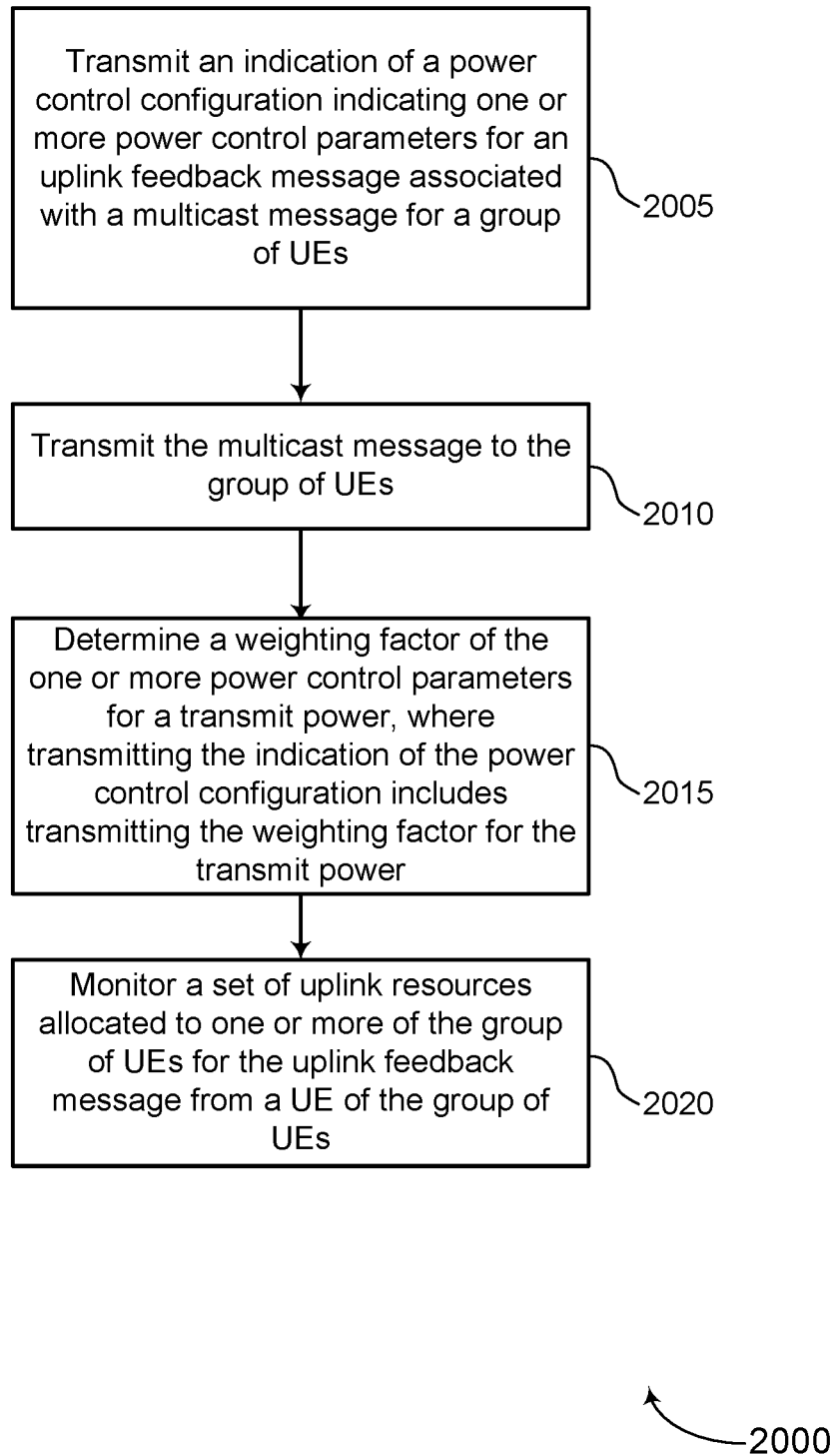

FIG. 20 shows a flowchart illustrating a method 2000 that supports power control for shared feedback in accordance with aspects of the present disclosure. The operations of method 2000 may be implemented by a base station 105 or its components as described herein. For example, the operations of method 2000 may be performed by a power control manager as described with reference to FIGS. 11-14. In some examples, a base station may execute a set of instructions to control the functional elements of the base station to perform the functions described below. Additionally or alternatively, a base station may perform aspects of the functions described below using special-purpose hardware.

At 2005, the base station may transmit an indication of a power control configuration indicating one or more power control parameters for an uplink feedback message associated with a multicast message for a group of UEs. The operations of 2005 may be performed according to the methods described herein. In some examples, aspects of the operations of 2005 may be performed by a configuration transmitter as described with reference to FIGS. 11-14.

At 2010, the base station may transmit the multicast message to the group of UEs. The operations of 2010 may be performed according to the methods described herein. In some examples, aspects of the operations of 2010 may be performed by a multicast component as described with reference to FIGS. 11-14.

In some examples, the one or more power control parameters may include a weighting factor for an uplink control channel. At 2015, the base station may determine the weighting factor of the one or more power control parameters for a transmit power, in which transmitting the indication of the power control configuration includes transmitting an indication of the weighting factor of the one or more power control parameters for the transmit power. The operations of 2015 may be performed according to the methods described herein. In some examples, aspects of the operations of 2015 may be performed by a weighting factor component as described with reference to FIGS. 11-14.

At 2020, the base station may monitor a set of uplink resources allocated to one or more of the group of UEs for the uplink feedback message from a UE of the group of UEs. The operations of 2020 may be performed according to the methods described herein. In some examples, aspects of the operations of 2020 may be performed by a feedback monitor as described with reference to FIGS. 11-14.

Figure 21:
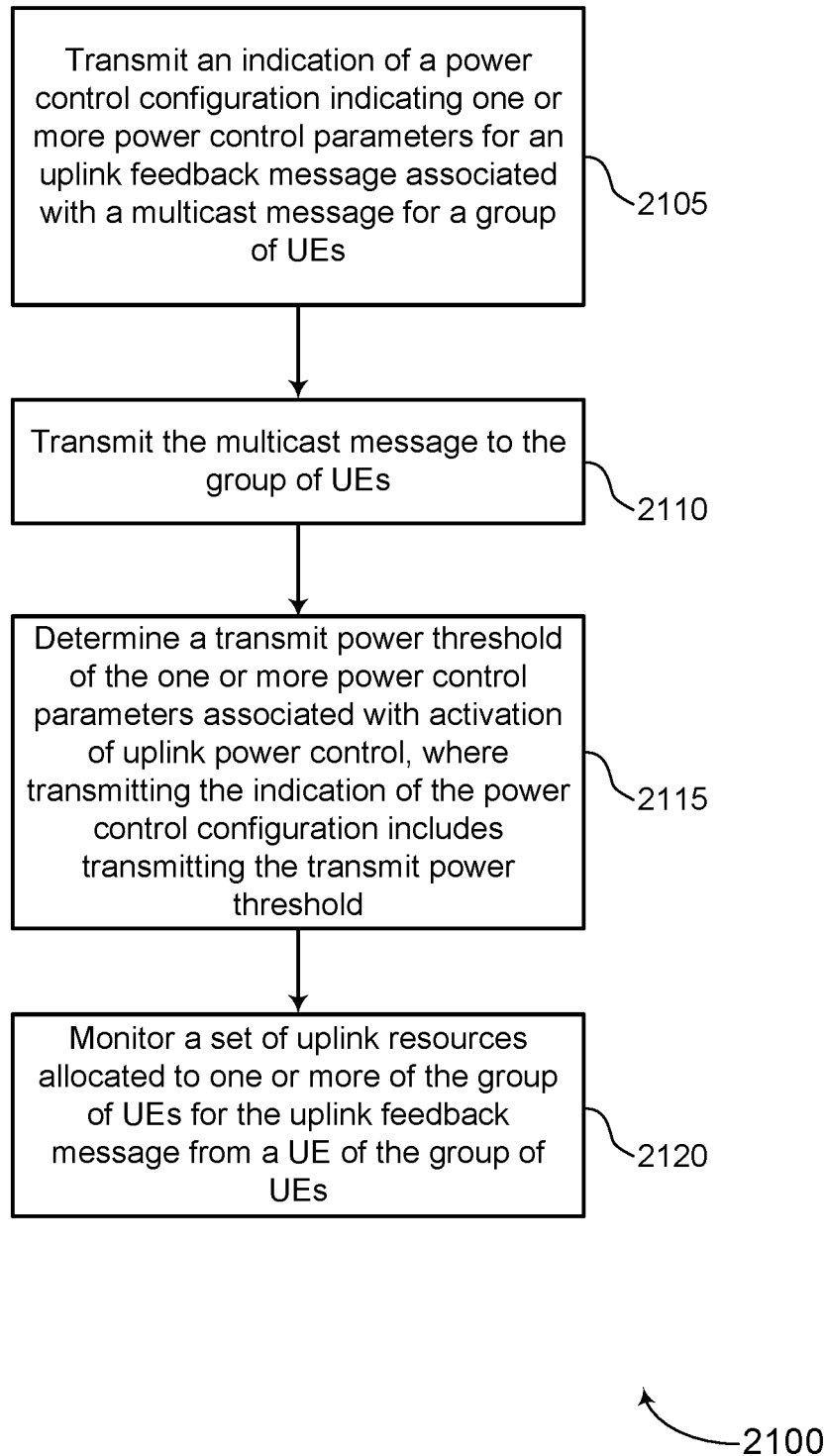

FIG. 21 shows a flowchart illustrating a method 2100 that supports power control for shared feedback in accordance with aspects of the present disclosure. The operations of method 2100 may be implemented by a base station 105 or its components as described herein. For example, the operations of method 2100 may be performed by a power control manager as described with reference to FIGS. 11-14. In some examples, a base station may execute a set of instructions to control the functional elements of the base station to perform the functions described below. Additionally or alternatively, a base station may perform aspects of the functions described below using special-purpose hardware.

At 2105, the base station may transmit an indication of a power control configuration indicating one or more power control parameters for an uplink feedback message associated with a multicast message for a group of UEs. The operations of 2105 may be performed according to the methods described herein. In some examples, aspects of the operations of 2105 may be performed by a configuration transmitter as described with reference to FIGS. 11-14.

At 2110, the base station may transmit the multicast message to the group of UEs. The operations of 2110 may be performed according to the methods described herein. In some examples, aspects of the operations of 2110 may be performed by a multicast component as described with reference to FIGS. 11-14.

At 2115, the base station may determine a transmit power threshold of the one or more power control parameters associated with activation of uplink power control, in which transmitting the indication of the power control configuration includes transmitting an indication of the transmit power threshold of the one or more power control parameters. The operations of 2115 may be performed according to the methods described herein. In some examples, aspects of the operations of 2115 may be performed by a power component as described with reference to FIGS. 11-14.

At 2120, the base station may monitor a set of uplink resources allocated to one or more of the group of UEs for the uplink feedback message from a UE of the group of UEs. The operations of 2120 may be performed according to the methods described herein. In some examples, aspects of the operations of 2120 may be performed by a feedback monitor as described with reference to FIGS. 11-14.

The following provides an overview of aspects of the present disclosure:

Aspect 1: A method for wireless communications at a UE, comprising: receiving, from a base station, a power control configuration indicating one or more power control parameters for an uplink feedback message associated with a multicast message; monitoring a set of downlink resources for the multicast message from the base station; determining a decoding failure for the multicast message based at least in part on the monitoring; determining, based at least in part on the one or more power control parameters, whether to transmit the uplink feedback message indicating the decoding failure via a set of uplink resources allocated to a group of UEs comprising the UE; and communicating with the base station based at least in part on determining whether to transmit the uplink feedback message indicating the decoding failure.

Aspect 2: The method of aspect 1, wherein the one or more power control parameters include a weighting factor for an uplink control channel, the method further comprising: determining a transmit power for the uplink feedback message based at least in part on the weighting factor, wherein communicating with the base station comprises transmitting the uplink feedback message in the uplink control channel via the set of uplink resources based at least in part on the transmit power.

Aspect 3: The method of aspect 2, further comprising: determining a weighting factor of the one or more power control parameters for an uplink control channel based at least in part on the power control configuration; and determining a transmit power for the uplink feedback message based at least in part on the weighting factor, wherein communicating with the base station comprises transmitting the uplink feedback message in the uplink control channel via the set of uplink resources based at least in part on the transmit power.

Aspect 4: The method of aspect 3, wherein the one or more power control parameters include a weighting factor, the method further comprising: determining the weighting factor from a set of weighting factors based at least in part on a channel quality parameter associated with the UE, wherein the channel quality parameter comprises one or more of a pathloss, a signal to interference plus noise ratio, a signal to noise ratio, a reference signal received power, a reference signal received quality, or a channel quality indicator.

Aspect 5: The method of any of aspects 3 through 4, further comprising receiving an indication of the weighting factor of the one or more power control parameters from the base station.

Aspect 6: The method of any of aspects 3 through 5, wherein the weighting factor is different than an alpha value configured for an uplink shared channel transmission.

Aspect 7: The method of any of aspects 3 through 6, wherein the weighting factor is greater than.

Aspect 8: The method of any of aspects 2 through 7, further comprising activating uplink power control based at least in part on the power control configuration, wherein activation of the uplink power control corresponds to a first set of open loop power control parameters of the one or more power control parameters different than a second set of open loop power control parameters of the one or more power control parameters associated with deactivation of the uplink power control.

Aspect 9: The method of any of aspects 2 through 8, wherein the one or more power control parameters include a transmit power threshold, the method further comprising: activating uplink power control based at least in part on a comparison of the transmit power to the transmit power threshold, wherein communicating with the base station is based at least in part on activating the uplink power control.

Aspect 10: The method of aspect 9, wherein the transmit power threshold corresponds to a maximum power of an uplink carrier configured for the UE or a maximum power capability of the UE.

Aspect 11: The method of any of aspects 9 through 10, further comprising receiving an indication of the transmit power threshold of the one or more power control parameters from the base station, wherein determining the transmit power threshold for the UE is based at least in part on receiving the indication of the transmit power threshold.

Aspect 12: The method of any of aspects 2 through 11, wherein the channel quality parameter of the UE exceeds a channel quality threshold, the method further comprising determining a transmit power for the uplink feedback message using a first power control parameter of the one or more power control parameters based at least in part on the channel quality parameter exceeding the channel quality threshold, wherein communicating with the base station is based at least in part on determining the transmit power for the uplink feedback message.

Aspect 13: The method of aspect 12, wherein the channel quality parameter of the UE is within a range between the channel quality threshold and a second channel quality threshold the method further comprising: determining the transmit power from a set of transmit powers for the uplink feedback message using a second power control parameter of the one or more power control parameters different than the first power control parameter based at least in part on the channel quality parameter being within the range, wherein communicating with the base station is based at least in part on determining the transmit power for the uplink feedback message.

Aspect 14: The method of aspect 13, wherein the first and second power control parameters each comprise one of a weighting factor or an open loop power control parameter.

Aspect 15: The method of any of aspects 12 through 14, further comprising receiving an indication of the channel quality threshold from the base station, wherein determining that the channel quality parameter exceeds the channel quality threshold is based at least in part on receiving the indication of the channel quality threshold.

Aspect 16: The method of any of aspects 2 through 15, further comprising determining a set of parameters of the one or more power control parameters for a transmit power of the uplink feedback message based at least in part on a receive power of the base station, wherein communicating with the base station is based at least in part on determining the set of parameters.

Aspect 17: The method of any of aspects 2 through 16, further comprising: selecting an open loop power control parameter from a plurality of open loop power control parameters of the one or more power control parameters; selecting a weighting factor from a set of weighting factors of the one or more power control parameters; and determining a transmit power from a set of transmit powers for the uplink feedback message based at least in part on the open loop power control parameter and the weighting factor, wherein communicating with the base station is based at least in part on determining the transmit power.

Aspect 18: The method of any of aspects 2 through 17, wherein the channel quality parameter of the UE satisfies a channel quality threshold, the method further comprising refraining from transmitting the uplink feedback message based at least in part on the channel quality parameter of the UE crossing the channel quality threshold.

Aspect 19: The method of aspect 18, further comprising receiving, from the base station, an indication of a probability factor of the one or more power control parameters for the UE, wherein determining whether to transmit the uplink feedback message is based at least in part on the probability factor.

Aspect 20: The method of aspect 19, further comprising: determining a probability threshold of the one or more power control parameters for the UE; and determining that a number of decoding failures at the UE satisfies the probability threshold, wherein communicating with the base station comprises transmitting the uplink feedback message based at least in part on the number of decoding failures satisfying the probability threshold.

Aspect 21: The method of any of aspects 2 through 20, further comprising: determining that the UE corresponds to a zone of a plurality of multicast zones, wherein each of the plurality of multicast zones is associated with one or more of a respective location, a respective beam, a respective sector, a respective angle, a respective distance, a respective channel quality parameter, or a respective transmission configuration indicator state; and determining the set of uplink resources based at least in part on the zone, wherein communicating with the base station is based at least in part on determining the set of uplink resources.

Aspect 22: The method of aspect 21, further comprising receiving an indication of the zone or a zone identifier from the base station, wherein determining that the UE corresponds to the zone is based at least in part on receiving the indication of the zone or the zone identifier.

Aspect 23: A method for wireless communications at a base station, comprising: transmitting an indication of a power control configuration indicating one or more power control parameters for an uplink feedback message associated with a multicast message for a group of user equipment (UEs); transmitting the multicast message to the group of UEs; and monitoring a set of uplink resources allocated to one or more of the group of UEs for the uplink feedback message from a UE of the group of UEs.

Aspect 24: The method of aspect 23, wherein the one or more power control parameters further include a transmit power threshold associated with activation of uplink power control, the transmit power threshold corresponding to a maximum power capability of the UE, wherein transmitting the indication of the power control configuration comprises transmitting an indication of the transmit power threshold of the one or more power control parameters.

Aspect 25: The method of any of aspects 23 through 24, wherein the one or more power control parameters include one or more channel quality thresholds corresponding to different weight factors, open loop power control parameters, or both, the method further comprising transmitting an indication of the one or more channel quality thresholds of the one or more power control parameters.

Aspect 26: The method of any of aspects 23 through 25, further comprising transmitting a probability factor or a probability threshold of the one or more power control parameters to at least one UE of the group of UEs, wherein transmitting the indication of the power control configuration comprises transmitting an indication of the probability factor or the probability threshold.

Aspect 27: The method of any of aspects 23 through 26, further comprising transmitting an indication of a zone of a plurality of multicast zones to at least one UE of the group of UEs, wherein each of the plurality of multicast zones is associated with one or more of a respective location, a respective beam, a respective sector, a respective angle, a respective distance, a respective channel quality parameter, or a respective transmission configuration indicator state, transmitting the indication of the power control configuration comprises transmitting the indication of the zone.

Aspect 28: An apparatus for wireless communications at a UE, comprising a processor; memory coupled with the processor; and instructions stored in the memory and executable by the processor to cause the apparatus to perform a method of any of aspects 1 through 1.

Aspect 29: An apparatus for wireless communications at a UE, comprising at least one means for performing a method of any of aspects 1 through 1.

Aspect 30: A non-transitory computer-readable medium storing code for wireless communications at a UE, the code comprising instructions executable by a processor to perform a method of any of aspects 1 through 1.

Aspect 31: An apparatus comprising a processor; memory coupled with the processor; and instructions stored in the memory and executable by the processor to cause the apparatus to perform a method of any of aspects 2 through 22.

Aspect 32: An apparatus comprising at least one means for performing a method of any of aspects 2 through 22.

Aspect 33: A non-transitory computer-readable medium storing code the code comprising instructions executable by a processor to perform a method of any of aspects 2 through 22.

Aspect 34: An apparatus for wireless communications at a base station, comprising a processor; memory coupled with the processor; and instructions stored in the memory and executable by the processor to cause the apparatus to perform a method of any of aspects 23 through 27.

Aspect 35: An apparatus for wireless communications at a base station, comprising at least one means for performing a method of any of aspects 23 through 27.

Aspect 36: A non-transitory computer-readable medium storing code for wireless communications at a base station, the code comprising instructions executable by a processor to perform a method of any of aspects 23 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (for example, a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at different locations, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc in which disks usually reproduce data magnetically, while discs reproduce data optically with lasers. Combinations of the above are also included within the scope of computer-readable media.

As used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (for example, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving, from a network device, a power control configuration indicating one or more power control parameters for an uplink feedback message associated with a multicast message;
    monitoring a set of downlink resources for the multicast message from the network device;
    determining a decoding failure for the multicast message based at least in part on the monitoring;
    determining, based at least in part on the one or more power control parameters, whether to transmit the uplink feedback message indicating the decoding failure via a set of uplink resources allocated to a group of UEs comprising the UE; and
    communicating with the network device based at least in part on determining whether to transmit the uplink feedback message indicating the decoding failure.

2. The method of claim 1, wherein the one or more power control parameters include a weighting factor for an uplink control channel, the method further comprising:
    determining a transmit power from a set of transmit powers for the uplink feedback message based at least in part on the weighting factor, wherein communicating with the network device comprises transmitting the uplink feedback message in the uplink control channel via the set of uplink resources based at least in part on the transmit power.

3. The method of claim 2, further comprising determining the weighting factor from a set of weighting factors based at least in part on a channel quality parameter associated with the UE, wherein the channel quality parameter comprises one or more of a pathloss, a signal to interference plus noise ratio, a signal to noise ratio, a reference signal received power, a reference signal received quality, or a channel quality indicator.

4. The method of claim 2, further comprising receiving an indication of the weighting factor from the network device.

5. The method of claim 2, wherein the weighting factor is different than an alpha value configured for an uplink shared channel transmission.

6. The method of claim 2, wherein the weighting factor is greater than 1.

7. The method of claim 1, further comprising activating uplink power control based at least in part on the power control configuration, wherein activation of the uplink power control corresponds to a first set of open loop power control parameters of the one or more power control parameters different than a second set of open loop power control parameters of the one or more power control parameters associated with deactivation of the uplink power control.

8. The method of claim 1, wherein the one or more power control parameters further include a transmit power threshold, the method further comprising:
    determining a transmit power from a set of transmit powers for the uplink feedback message; and
    activating uplink power control based at least in part on a comparison of the transmit power to the transmit power threshold, wherein communicating with the network device is based at least in part on activating the uplink power control.

9. The method of claim 8, wherein the transmit power threshold corresponds to a maximum power of an uplink carrier configured for the UE or a maximum power capability of the UE.

10. The method of claim 8, further comprising receiving an indication of the transmit power threshold from the network device, wherein determining the transmit power threshold for the UE is based at least in part on receiving the indication of the transmit power threshold.

11. The method of claim 1, wherein a channel quality parameter of the UE exceeds a channel quality threshold, the method further comprising:
    determining a transmit power from a set of transmit powers for the uplink feedback message using a first power control parameter of the one or more power control parameters based at least in part on the channel quality parameter exceeding the channel quality threshold, wherein communicating with the network device is based at least in part on determining the transmit power for the uplink feedback message.

12. The method of claim 11, wherein the channel quality parameter of the UE is within a range between the channel quality threshold and a second channel quality threshold, the method further comprising:
    determining the transmit power from the set of transmit powers for the uplink feedback message using a second power control parameter of the one or more power control parameters different than the first power control parameter based at least in part on the channel quality parameter being within the range, wherein communicating with the network device is based at least in part on determining the transmit power for the uplink feedback message.

13. The method of claim 12, wherein the first power control parameter and the second power control parameter each comprise one of a weighting factor or an open loop power control parameter.

14. The method of claim 11, further comprising receiving an indication of the channel quality threshold from the network device, wherein determining that the channel quality parameter exceeds the channel quality threshold is based at least in part on receiving the indication of the channel quality threshold.

15. The method of claim 1, further comprising determining a set of parameters of the one or more power control parameters for a transmit power of the uplink feedback message based at least in part on a receive power of the network device, wherein communicating with the network device is based at least in part on determining the set of parameters.

16. The method of claim 1, further comprising:
selecting an open loop power control parameter from a plurality of open loop power control parameters of the one or more power control parameters;
selecting a weighting factor from a set of weighting factors of the one or more power control parameters; and
determining a transmit power from a set of transmit powers for the uplink feedback message based at least in part on the open loop power control parameter and the weighting factor, wherein communicating with the network device is based at least in part on determining the transmit power.

17. The method of claim 1, wherein a channel quality parameter of the UE satisfies a channel quality threshold, the method further comprising refraining from transmitting the uplink feedback message to the network device based at least in part on the channel quality parameter of the UE crossing the channel quality threshold.

18. The method of claim 17, further comprising receiving, from the network device, an indication of a probability factor of the one or more power control parameters for the UE, wherein determining whether to transmit the uplink feedback message is based at least in part on the probability factor.

19. The method of claim 18, wherein the one or more power control parameters for the UE includes a probability threshold, the method further comprising:
determining that a number of decoding failures at the UE satisfies the probability threshold, wherein communicating with the network device comprises transmitting the uplink feedback message based at least in part on the number of decoding failures satisfying the probability threshold.

20. The method of claim 1, further comprising:
determining that the UE corresponds to a zone of a plurality of multicast zones, wherein each of the plurality of multicast zones is associated with one or more of a respective location, a respective beam, a respective sector, a respective angle, a respective distance, a respective channel quality parameter, or a respective transmission configuration indicator state; and
determining the set of uplink resources based at least in part on the zone, wherein communicating with the network device is based at least in part on determining the set of uplink resources.

21. The method of claim 20, further comprising receiving an indication of the zone or a zone identifier from the network device, wherein determining that the UE corresponds to the zone is based at least in part on receiving the indication of the zone or the zone identifier.

22. A method for wireless communications at a network device, comprising:
transmitting an indication of a power control configuration indicating one or more power control parameters for an uplink feedback message associated with a multicast message for a group of user equipment (UEs), wherein the one or more power control parameters comprise one or more channel quality thresholds corresponding to different weight factors, open loop power control parameters, or both;
transmitting an indication of the one or more channel quality thresholds of the one or more power control parameters;
transmitting the multicast message to the group of UEs; and
monitoring a set of uplink resources allocated to one or more of the group of UEs for the uplink feedback message from a UE of the group of UEs.

23. The method of claim 22, wherein the power control configuration comprises a weighting factor of the one or more power control parameters for a transmit power, the method further comprising:
transmitting an indication of the weighting factor of the one or more power control parameters for the transmit power.

24. The method of claim 23, further comprising:
receiving, from at least one UE of the group of UEs, a report comprising a channel quality indication for the at least one UE; and
determining the weighting factor from a set of weighting factors for the transmit power for the at least one UE based at least in part on the channel quality indication.

25. The method of claim 22, wherein the one or more power control parameters further include a transmit power threshold associated with activation of uplink power control, the transmit power threshold corresponding to a maximum power capability of the UE, the method further comprising transmitting an indication of the transmit power threshold of the one or more power control parameters.

26. The method of claim 22, wherein the one or more power control parameters further comprise a probability factor or a probability threshold, the method further comprising transmitting an indication of the probability factor or the probability threshold of the one or more power control parameters to at least one UE of the group of UEs.

27. The method of claim 22, further comprising transmitting an indication of a zone of a plurality of multicast zones to at least one UE of the group of UEs, wherein each of the plurality of multicast zones is associated with one or more of a respective location, a respective beam, a respective sector, a respective angle, a respective distance, a respective channel quality parameter, or a respective transmission configuration indicator state, wherein transmitting the indication of the power control configuration comprises transmitting the indication of the zone.

28. An apparatus for wireless communications at a user equipment (UE), comprising:
a processor,
memory coupled with the processor; and
instructions stored in the memory and executable by the processor to cause the apparatus to:
receive, from a network device, a power control configuration indicating one or more power control parameters for an uplink feedback message associated with a multicast message;
monitor a set of downlink resources for the multicast message from the network device;
determine a decoding failure for the multicast message based at least in part on the monitoring;
determine, based at least in part on the one or more power control parameters, whether to transmit the uplink feedback message indicating the decoding failure via a set of uplink resources allocated to a group of UEs comprising the UE; and
communicate with the network device based at least in part on determining whether to transmit the uplink feedback message indicating the decoding failure.

29. An apparatus for wireless communications at a network device, comprising:
  a processor,
  memory coupled with the processor; and
  instructions stored in the memory and executable by the processor to cause the apparatus to:
    transmit an indication of a power control configuration indicating one or more power control parameters for an uplink feedback message associated with a multicast message for a group of user equipment (UEs), wherein the one or more power control parameters comprise one or more channel quality thresholds corresponding to different weight factors, open loop power control parameters, or both;
    transmit an indication of the one or more channel quality thresholds of the one or more power control parameters;
    transmit the multicast message to the group of UEs; and
    monitor a set of uplink resources allocated to one or more of the group of UEs for the uplink feedback message from a UE of the group of UEs.

* * * * *